US012704592B2

(12) United States Patent
Kashiwagi et al.

(10) Patent No.: US 12,704,592 B2
(45) Date of Patent: Aug. 11, 2026

(54) RADAR APPARATUS AND MOVING OBJECT EQUIPPED WITH RADAR APPARATUS

(71) Applicant: Murata Manufacturing Co., Ltd., Nagaokakyo (JP)

(72) Inventors: Katsuhisa Kashiwagi, Nagaokakyo (JP); Tsubasa Kouno, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 246 days.

(21) Appl. No.: 18/402,772

(22) Filed: Jan. 3, 2024

(65) Prior Publication Data

US 2024/0151812 A1 May 9, 2024

Related U.S. Application Data

(63) Continuation of application No. PCT/JP2022/022476, filed on Jun. 2, 2022.

(30) Foreign Application Priority Data

Jul. 5, 2021 (JP) ................................ 2021-111708

(51) Int. Cl.
*G01S 7/35* (2006.01)
*G01S 13/536* (2006.01)
(Continued)

(52) U.S. Cl.
CPC ............ *G01S 7/354* (2013.01); *G01S 13/536* (2013.01); *G01S 13/75* (2013.01); *G01S 13/931* (2013.01)

(58) Field of Classification Search
None
See application file for complete search history.

(56) References Cited

U.S. PATENT DOCUMENTS 5,999,118 A * 12/1999 Hethuin .................. G01S 13/34 342/122
8,125,372 B2 * 2/2012 Focke .................. G01S 13/931 342/55
(Continued)

FOREIGN PATENT DOCUMENTS

JP H09-178849 A 7/1997
JP H10-20025 A 1/1998
(Continued)

OTHER PUBLICATIONS

International Search Report and Written Opinion mailed on Jul. 12, 2022, received for PCT Application PCT/JP2022/022476, filed on Jun. 2, 2022, 09 pages including English Translation.

*Primary Examiner* — Bernarr E Gregory
(74) *Attorney, Agent, or Firm* — XSENSUS LLP

(57) ABSTRACT

Transmission signal generation circuitry generates a transmission chirp, and the transmission chirp is transmitted from a transmission antenna. A reflected wave, from an object to be detected, of the transmission chirp transmitted from the transmission antenna is received by a reception antenna. A mixer mixes the transmission chirp and a reception chirp received by the reception antenna to generate an intermediate frequency signal. Signal processing circuitry obtains, for a plurality of respective analysis periods corresponding to different frequency bands of the transmission chirp, frequency spectral waveforms of the intermediate frequency signal, detects a peak appearing in the plurality of frequency spectral waveforms, and determines, based on variations in peak position among the plurality of frequency spectral waveforms, whether or not the peak is due to a valid object.

20 Claims, 16 Drawing Sheets

(51) Int. Cl.
*G01S 13/75* (2006.01)
*G01S 13/931* (2020.01)

(56) References Cited

U.S. PATENT DOCUMENTS 8,427,361 B2 * 4/2013 Sato ...................... G01S 13/931 342/107
9,778,355 B2 * 10/2017 Li ......................... G01S 13/931
2003/0156055 A1 * 8/2003 Tamatsu ................ G01S 13/345 342/107
2005/0156780 A1 * 7/2005 Bonthron ............. G01S 13/343 342/134

FOREIGN PATENT DOCUMENTS

JP 2000-147102 A 5/2000
JP 3403640 B2 * 5/2003 ............. G01S 13/34
JP 2014-119353 A 6/2014
JP 2015-072224 A 4/2015
JP 2016-148515 A 8/2016
JP 2019-505806 A 2/2019
WO 2011/092814 A1 8/2011

* cited by examiner

Fig.1

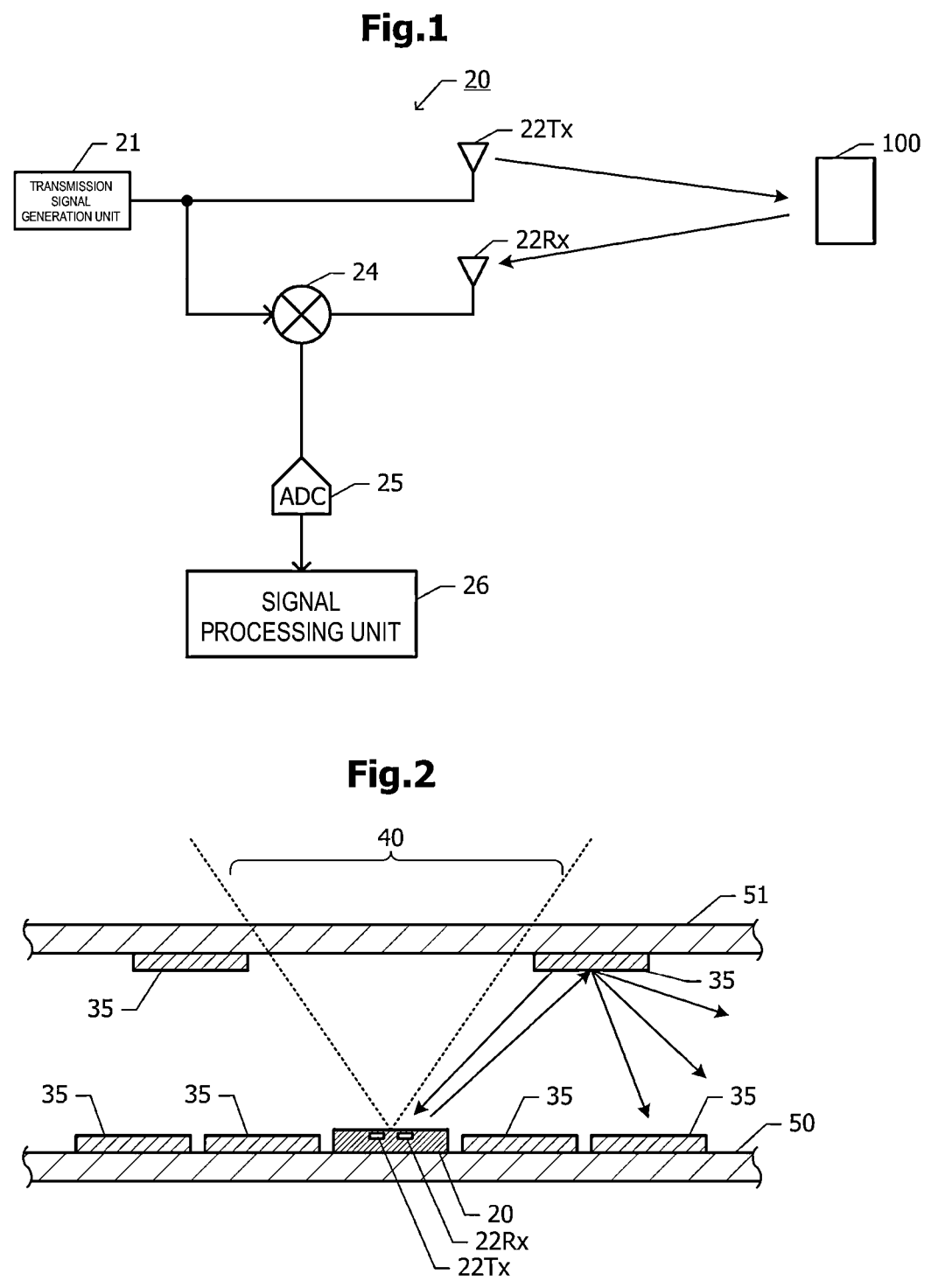

20
21
TRANSMISSION SIGNAL GENERATION UNIT
22Tx
100
22Rx
24
ADC
25
SIGNAL PROCESSING UNIT
26

| | FREQUENCY $f_3$ | FREQUENCY $f_2$ | FREQUENCY $f_1$ |
|---|---|---|---|
| METAL SURFACE | | | |
| METASURFACE | | | |

TRANSMISSION CHIRP
RECEPTION CHIRP
FREQUENCY
$f_3$
$f_2$
$f_1$
T1
T2
T3
ELAPSED TIME 40
35E 35D 35D 35E 51
22Tx 22Rx 50
35C 35B 35A 20 35A 35B 35C

Fig.7B Fig.7C

REFLECTIVE STRUCTURE 35A
REFLECTIVE STRUCTURE 35C
REFLECTIVE STRUCTURE 35B (METAL SURFACE)
REFLECTION PHASE
$\phi$ msc
$\phi$ msa
$\phi$ met
$f_1$ $f_2$ $f_3$
FREQUENCY

SA7

IS POSITION OF DETERMINATION TARGET PEAK INCLUDED IN INTERMEDIATE FREQUENCY BAND OF ESTIMATED MULTIPATH? — SA71

Y

REDUCE DETERMINATION THRESHOLD — SA72

N

DETERMINE DEGREE OF VARIATION ON BASIS OF DETERMINATION THRESHOLD — SA73

RETURN

TRANSMISSION CHIRP
RECEPTION CHIRP
FREQUENCY
$f_3$
$f_2$
$f_1$
BW1
BW2
BW3
T1
T2
T3
ELAPSED TIME

TRANSMISSION CHIRP
RECEPTION CHIRP
FREQUENCY
$f_4$
BWt
Tt
ELAPSED TIME

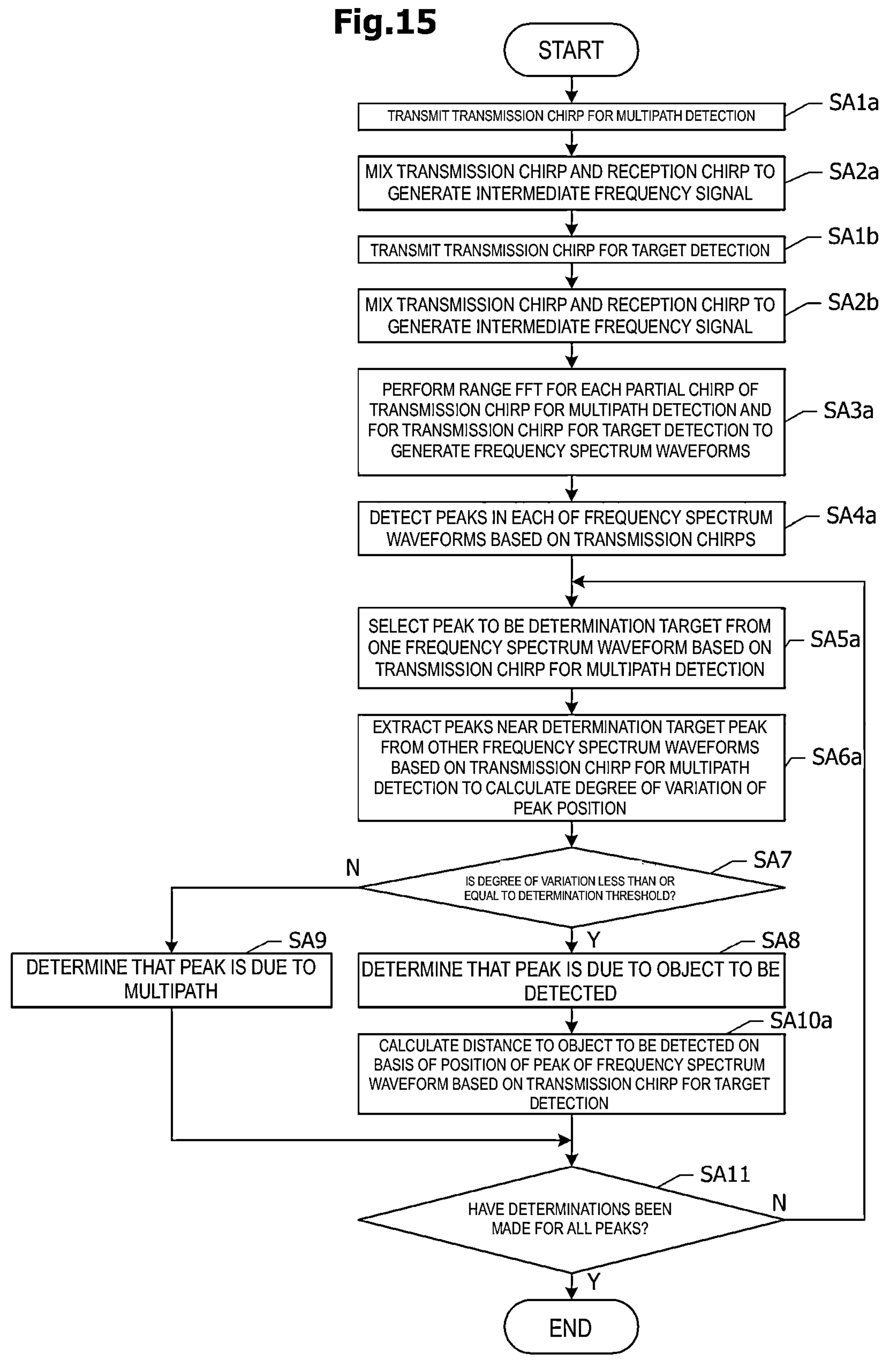

Fig.15
START
TRANSMIT TRANSMISSION CHIRP FOR MULTIPATH DETECTION
SA1a
MIX TRANSMISSION CHIRP AND RECEPTION CHIRP TO GENERATE INTERMEDIATE FREQUENCY SIGNAL
SA2a
TRANSMIT TRANSMISSION CHIRP FOR TARGET DETECTION
SA1b
MIX TRANSMISSION CHIRP AND RECEPTION CHIRP TO GENERATE INTERMEDIATE FREQUENCY SIGNAL
SA2b
PERFORM RANGE FFT FOR EACH PARTIAL CHIRP OF TRANSMISSION CHIRP FOR MULTIPATH DETECTION AND FOR TRANSMISSION CHIRP FOR TARGET DETECTION TO GENERATE FREQUENCY SPECTRUM WAVEFORMS
SA3a
DETECT PEAKS IN EACH OF FREQUENCY SPECTRUM WAVEFORMS BASED ON TRANSMISSION CHIRPS
SA4a
SELECT PEAK TO BE DETERMINATION TARGET FROM ONE FREQUENCY SPECTRUM WAVEFORM BASED ON TRANSMISSION CHIRP FOR MULTIPATH DETECTION
SA5a
EXTRACT PEAKS NEAR DETERMINATION TARGET PEAK FROM OTHER FREQUENCY SPECTRUM WAVEFORMS BASED ON TRANSMISSION CHIRP FOR MULTIPATH DETECTION TO CALCULATE DEGREE OF VARIATION OF PEAK POSITION
SA6a
IS DEGREE OF VARIATION LESS THAN OR EQUAL TO DETERMINATION THRESHOLD?
SA7
N
Y
DETERMINE THAT PEAK IS DUE TO MULTIPATH
SA9
DETERMINE THAT PEAK IS DUE TO OBJECT TO BE DETECTED
SA8
CALCULATE DISTANCE TO OBJECT TO BE DETECTED ON BASIS OF POSITION OF PEAK OF FREQUENCY SPECTRUM WAVEFORM BASED ON TRANSMISSION CHIRP FOR TARGET DETECTION
SA10a
HAVE DETERMINATIONS BEEN MADE FOR ALL PEAKS?
SA11
N
Y
END

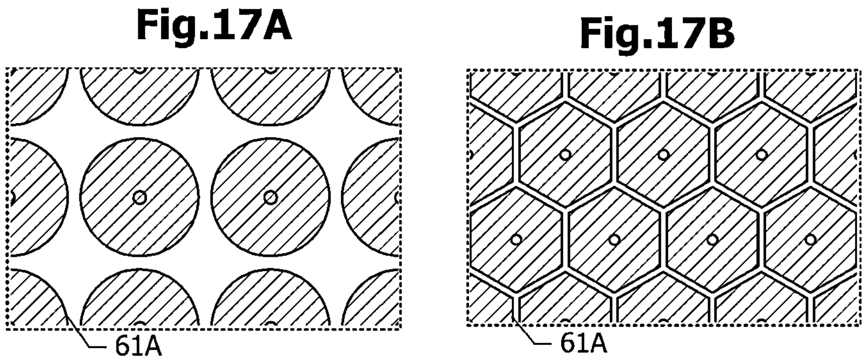
Fig.17A
61A
Fig.17B
61A
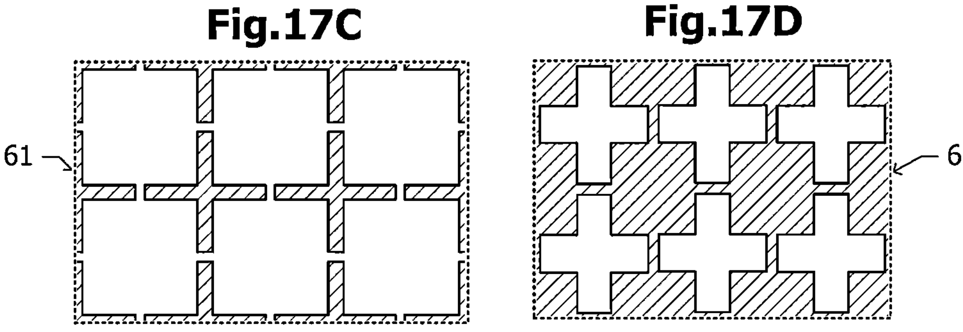
Fig.17C
61
Fig.17D
61
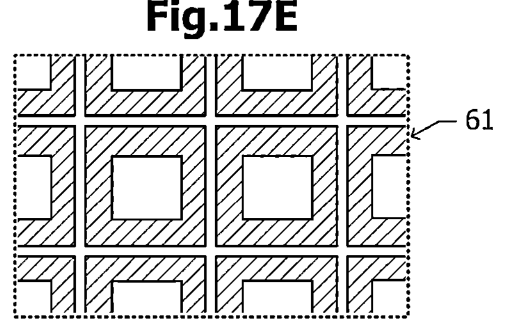
Fig.17E
61

RADAR APPARATUS AND MOVING OBJECT EQUIPPED WITH RADAR APPARATUS

CROSS-REFERENCE TO RELATED APPLICATIONS

The present application is a continuation of PCT application PCT/JP2022/022476, filed Jun. 2, 2022, and claims priority to Japanese application JP 2021-111708, filed Jul. 5, 2021, the entire contents of each of which being incorporated herein by reference.

TECHNICAL FIELD

The present disclosure relates to a radar apparatus and a moving object equipped with the radar apparatus.

BACKGROUND ART

Patent Document 1 described below discloses a technology for determining, with high accuracy, whether or not an object detected by radar is an obstacle. In a radar apparatus disclosed in Patent Document 1, an object is determined not to be an obstacle in a case where the rate of change of the received signal strength of reflected waves, from the object, received by a reception antenna is within a predetermined range.

CITATION LIST

Patent Document

Patent Document 1: International Publication No. 2011/092814

SUMMARY

Technical Problems

Radar apparatuses based on existing technology make use of the fact that the received signal strength of reflected waves changes due to changes in the distance from the vehicle to an object. Thus, in a case where both the vehicle and the object are stationary, it is difficult to determine, with high accuracy, whether or not the object is an obstacle. A purpose of the present disclosure is to provide a radar apparatus capable of identifying, with high accuracy, an object to be detected even in a case where the object is stationary. Another purpose of the present disclosure is to provide a moving object equipped with this radar apparatus.

Solutions to Problems

According to an aspect of the present disclosure, a radar apparatus is provided that includes

- a transmission signal generation circuitry that generates a transmission chirp,
- a transmission antenna that transmits the transmission chirp,
- a reception antenna that is configured to receive a reflected wave, from an object to be detected, of the transmission chirp transmitted from the transmission antenna,
- a mixer that mixes the transmission chirp and a reception chirp received by the reception antenna to generate an intermediate frequency signal, and
- a signal processing unit that performs processing on the intermediate frequency signal, and
- signal processing circuitry configured to
- obtain, for a plurality of respective analysis periods corresponding to different frequency bands of the transmission chirp, frequency spectral waveforms of the intermediate frequency signal,
- detect a peak appearing in the plurality of frequency spectral waveforms, and
- determine, based on variations in peak position among the plurality of frequency spectral waveforms, whether or not the peak is due to a valid object.

According to another aspect of the present disclosure, a moving object is provided that includes

- a vehicle body, and
- a radar apparatus mounted on the vehicle body, and
- the radar apparatus includes
- a transmission signal generation circuitry that generates a transmission chirp,
- a transmission antenna that transmits the transmission chirp,
- a reception antenna that is configured to receive a reflected wave, from an object to be detected, of the transmission chirp transmitted from the transmission antenna,
- a mixer that mixes the transmission chirp and a reception chirp received by the reception antenna to generate an intermediate frequency signal, and
- signal processing circuitry configured to perform processing on the intermediate frequency signal, and
- the signal processing circuitry
- obtains, for a plurality of respective analysis periods corresponding to different frequency bands of the transmission chirp, frequency spectral waveforms of the intermediate frequency signal, and determines, based on variations in peak position among the plurality of frequency spectral waveforms, whether or not a peak is due to a valid object.

Advantageous Effects

Peaks based on reflections from unexpected objects may appear in the frequency spectral waveforms due to multipath. When a reflective structure having frequency-dependent characteristics is arranged along an assumed multipath route, the multipath route changes in accordance with frequency. In this case, variations occur in the positions of peaks appearing due to multipath in the frequency spectral waveforms generated for a plurality of respective analysis periods, and it is possible to distinguish a peak due to the object to be detected and a peak due to multipath from each other on the basis of the degree of variation of the peak position. In this manner, multipath effects are reduced on the basis of variations in peaks appearing in the frequency spectral waveforms, so that the object to be detected can be identified with high accuracy even in a case where the object is stationary.

BRIEF DESCRIPTION OF DRAWINGS

FIG. 1 is a schematic diagram of a radar apparatus according to a first embodiment.

FIG. 2 is a schematic cross-sectional view illustrating the radar apparatus according to the first embodiment and part of a moving object equipped with the radar apparatus.

FIG. 4A is a diagram illustrating a reflective structure to be simulated and the electric field strength of incident waves, and FIG. 4B is a diagram illustrating results of electromagnetic field simulations of reflected waves when radio waves of frequencies $f_1$, $f_2$, and $f_3$ are incident on reflective structures including a metal surface and a metasurface.

FIG. 7B is a schematic diagram for describing the reflection characteristics of a reflective structure arranged at the closest position to the radar apparatus, FIG. 7C is a schematic diagram for describing the reflection characteristics of a reflective structure having a metal surface.

FIG. 15 is a flowchart illustrating the procedure of a distance calculation method performed by a radar apparatus according to a fifth embodiment.

FIGS. 17A to 17E are plan views of portions of metasurfaces according to other specific examples.

DESCRIPTION OF EMBODIMENTS

First Embodiment

Figure 3A:
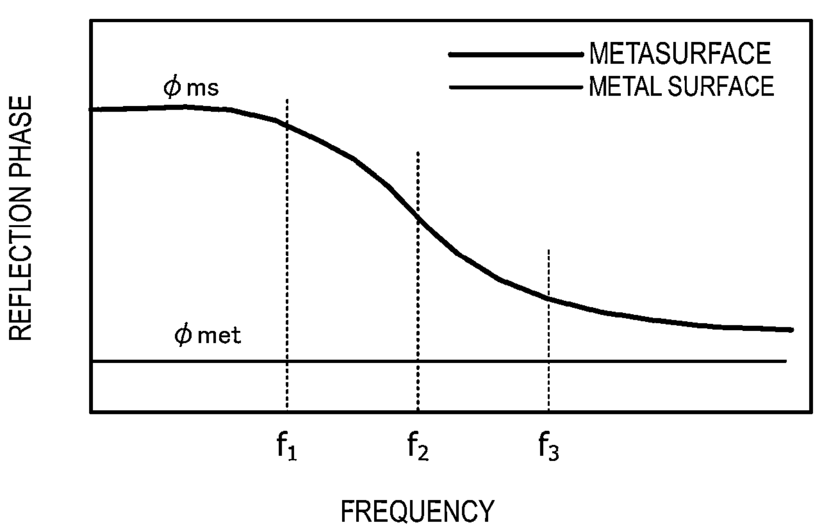
FIG. 3A is a graph illustrating the relationship between frequency and reflection phase.

A radar apparatus according to a first embodiment will be described with reference to the drawings from FIGS. 1 to 6.

FIG. 1 is a schematic diagram of a radar apparatus 20 according to the first embodiment. The radar apparatus 20 according to the first embodiment includes a transmission signal generation unit 21, a transmission antenna 22Tx, a reception antenna 22Rx, a mixer 24, an analog-to-digital (AD) converter 25, and a signal processing unit 26. The transmission signal generation unit 21 generates a continuously frequency modulated transmission chirp. Temporal changes in the frequency of the transmission chirp will be described later with reference to FIG. 5A. While the term "unit" is used herein for convenience, it should be recognized that each of the signal generation unit 21, and signal processing unit 26 are forms of "circuitry" that may be hardwired circuitry such as an Application Specific Integrated Circuit (ASIC), programmable logic array (PLA), or the like. Also, the circuitry may include programmable circuitry such as one or more processors that include CPUs, one or more memories that hold computer readable instructions (code) that upon execution by the one or more processors configure the one or more processors to execute the routines (processes) described herein.

The transmission chirp (a type of RF signal with multiple frequency components) generated by the transmission signal generation unit 21 (a signal generator, which implements a transmitter)) is transmitted from the transmission antenna 22Tx. The transmission chirp transmitted from the transmission antenna 22Tx is reflected by an object 100 to be detected, and reflected waves from the object 100 to be detected are received by the reception antenna 22Rx and subsequently detected by a receiver (detector). The frequency of the reflected waves received by the reception antenna 22Rx temporally, continuously changes with a slight delay from temporal changes in the frequency of the transmission chirp. The reception signal received by the reception antenna 22Rx is referred to as a reception chirp.

The mixer 24 mixes the transmission chirp and the reception chirp to generate an intermediate frequency (IF) signal. The AD converter 25 is circuitry that converts the intermediate frequency signal, which is an analog signal, into a digital signal. The signal processing unit 26 performs signal processing on the intermediate frequency signal that is converted into a digital signal. The signal processing unit 26 includes, for example, one or more digital signal processor(s) (DSP). Processing performed by the signal processing unit 26 will be described later with reference to FIGS. 5B and 6.

The transmission antenna 22Tx and the reception antenna 22Rx are formed on an antenna substrate. On this antenna substrate, circuit components that realize, for example, the functions of the transmission signal generation unit 21, the mixer 24, the AD converter 25, and the signal processing unit 26 are mounted.

FIG. 2 is a schematic cross-sectional view illustrating the radar apparatus 20 (FIG. 1) according to the first embodiment and part of a moving object equipped with the radar apparatus 20.

The radar apparatus 20 is mounted on a vehicle body 50 of the moving object. The radar apparatus 20 has a field of view 40 that faces outward from the vehicle body 50 and can detect objects within the field of view 40. An exterior 51 of the vehicle body is spaced apart from the radar apparatus 20 in the direction of the field of view 40. A plurality of reflective structures 35 are arranged to the side of and outward from the field of view 40. The plurality of reflective structures 35 are attached to the facing surfaces of the vehicle body 50 and the exterior 51 of the vehicle body.

The reflective structures 35 each include a metasurface having a two-dimensional periodic structure. Note that the reflective structures 35 may each be realized using a metamaterial having a three-dimensional periodic structure. In this specification, a metasurface having a two-dimensional periodic structure and a metamaterial having a three-dimensional periodic structure will be collectively referred to as "metasurfaces". Next, the characteristics of the reflective structure 35 including a metasurface will be described with reference to FIGS. 3A to 4B.

FIG. 3A is a graph illustrating the relationship between frequency and reflection phase. The horizontal axis represents frequency. The vertical axis represents reflection phase. The thick solid line and the thin solid line in the graph of FIG. 3A illustrate an example of a reflection phase φms on the metasurface and an example of a reflection phase φmet on a metal surface, respectively. The reflection phase φmet on the metal surface is constant. In contrast, the reflection phase φms on the metasurface changes depending on frequency. For example, as frequency increases in the order of $f_1$, $f_2$, and $f_3$, the reflection phase φms approaches the reflection phase φmet on the metal surface.

Figure 3B:
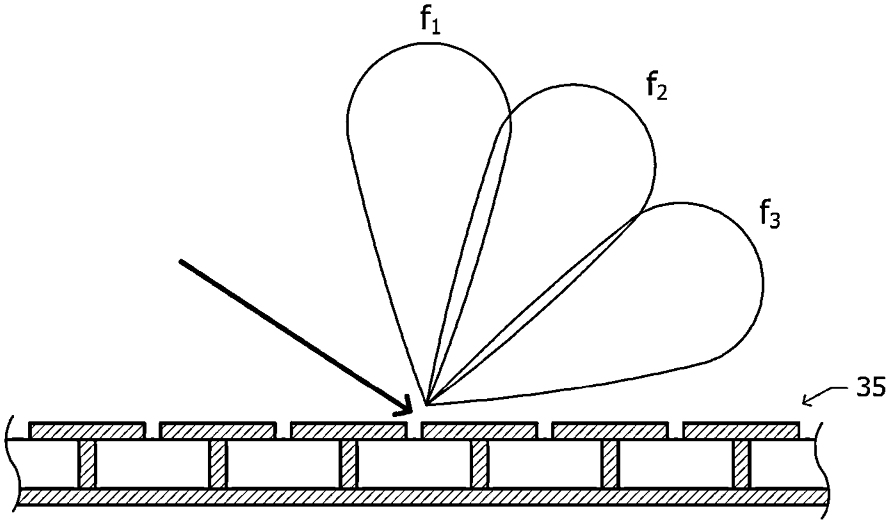
FIG. 3B is a diagram schematically illustrating an incident wave incident on a reflective structure and the way in which reflected waves from the reflective structure propagate.

FIG. 3B is a diagram schematically illustrating an incident wave incident on the reflective structure 35 and the way in which reflected waves from the reflective structure 35 propagate. The reflective structure 35 includes the metasurface. FIG. 3B illustrates, as an example, a mushroom metasurface. Various examples of metasurfaces will be described later with reference to the drawings from FIGS. 16A to 17E. Unlike a reflected wave from a metal surface, the direction of propagation of a reflected wave from a metasurface changes with frequency. For example, as frequency increases in the order of $f_1$, $f_2$, and $f_3$, the directions of propagation of reflected waves approach, from the direction normal to the metasurface, the directions of propagation of reflected waves from the metal surface. Note that the lower order frequencies (f1) have a reflection lobe that is more orthogonal to a main surface of the metasurface. On the other hand, the reflection lobes for mid-frequency f2, and higher-order frequency f3 are tilted forward, with the reflection lobe for f3 being close to that of reflections that would occur off a metallic surface.

Next, results of electromagnetic field simulations of the electric field strength of reflected waves from the metasurface will be described with reference to FIGS. 4A and 4B.

FIG. 4A is a diagram illustrating the metasurface to be simulated and the electric field strength of incident waves. The metasurface to be simulated is a mushroom metasurface where hexagonal metal elements are periodically arranged. In FIG. 4A, the electric field strength is illustrated in shades of gray. Regions with relatively high electric field strength are illustrated relatively faintly. The incident waves are plane waves and incident obliquely to the metasurface.

FIG. 4B is a diagram illustrating results of electromagnetic field simulations of reflected waves when radio waves of frequencies $f_1$, $f_2$, and $f_3$ are incident on the metal surface and metasurface. In FIG. 4B, regions with relatively high electric field strength are illustrated relatively faintly. The main directions of propagation of radio waves are indicated by white arrows with black outlines.

The direction of propagation of reflected waves from the metal surface is constant and independent of frequency. In contrast, the direction of propagation of reflected waves from the metasurface changes with frequency.

As described with reference to the drawings from FIGS. 3A to 4B, the directions of propagation of reflected waves that are waves reflected by the reflective structures 35 (FIG. 2) including metasurfaces change depending on frequency.

The radar apparatus 20 illustrated in FIG. 1 and in a radar apparatus including the reflective structures 35 illustrated in FIG. 2, radio waves transmitted from the transmission antenna 22Tx are reflected by the vehicle body 50 and the exterior 51 of the vehicle body and propagate. This forms multipath. When radio waves via multipath are reflected by a radio wave reflector and received by the reception antenna 22Rx (FIG. 1) via multipath, the radio wave reflector is detected as a false target (ghost) even though the radio wave reflector is not present within the field of view 40 (FIG. 1).

In the radar apparatus according to the first embodiment, the reflective structures 35 are mounted at positions on which radio waves traveling in a direction outside the field of view 40 or indirect waves thereof are incident. The direction of propagation of reflected waves that are waves reflected by the reflective structures 35 including metasurfaces changes depending on frequency in the frequency band of the transmission chirp. Thus, the length of the route for the radio waves transmitted from the transmission antenna 22Tx, reflected by radio wave reflectors via multipath, and received by the reception antenna 22Rx also changes depending on frequency.

Figures 5A, 5B:
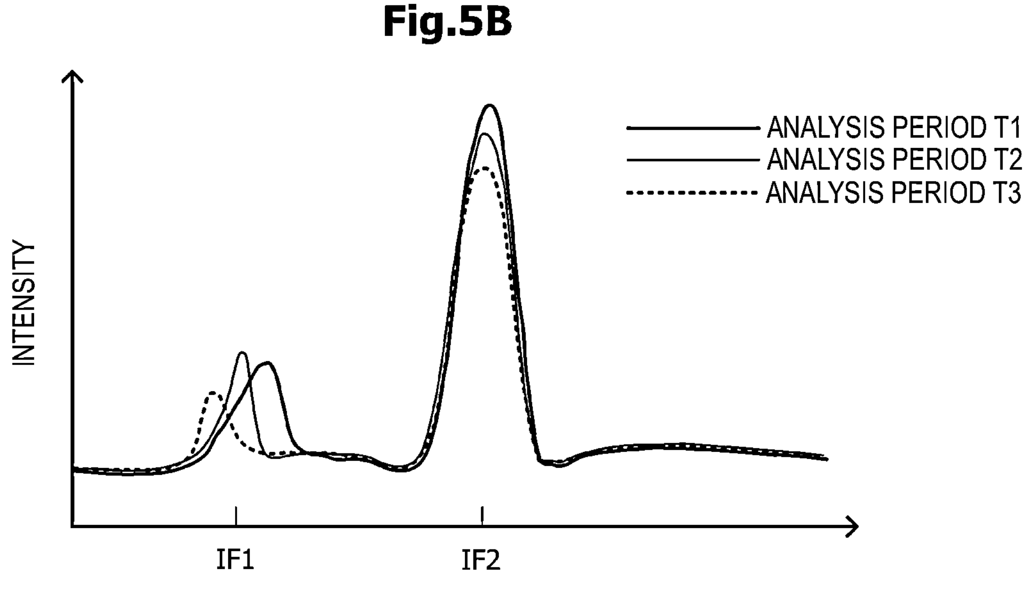
FIG. 5A is a graph illustrating temporal changes in the frequencies of a transmission chirp and a reception chirp.
FIG. 5B is a graph illustrating an example of frequency spectral waveforms.

The following describes, with reference to FIG. 5A, temporal changes in the frequency of the transmission chirp generated by the transmission signal generation unit 21 (FIG. 1) and in the frequency of the reception chirp received by the reception antenna 22Rx.

FIG. 5A is a graph illustrating temporal changes in the frequencies of the transmission chirp and the reception chirp. The horizontal axis represents elapsed time, and the vertical axis represents frequency. The solid line in the graph illustrated in FIG. 5A represents the transmission chirp, and the dashed line in the graph represents the reception chirp. The transmission chirp includes a plurality of partial chirps, for example, three partial chirps. The number of partial chirps included in the transmission chirp may be two or may also be four or more. Each of the plurality of partial chirps continuously increases in frequency over time, and increases linearly, for example. Center frequencies $f_1$, $f_2$, and $f_3$ of the frequency bands of the plurality of partial chirps are different from each other. Moreover, some of the frequency bands of the plurality of partial chirps overlap.

For example, the frequency (or more specifically the band of swept frequencies) of the first partial chirp drops discontinuously at the end of the first partial chirp, and the second partial chirp is started. The frequency of the second partial chirp drops discontinuously at the end of the second partial chirp, and the third partial chirp is started. The reception chirp is delayed from the transmission chirp in accordance with the distance to the object and changes in frequency.

The mixer 24 (FIG. 1) generates an intermediate frequency signal corresponding to the frequency difference between the transmission chirp and the reception chirp.

Next, processing performed by the signal processing unit 26 will be described with reference to FIG. 5B. The signal processing unit 26 performs a range fast Fourier transform (range-FFT) on the intermediate frequency signal generated by the mixer 24 to generate a frequency spectral waveform.

FIG. 5B is a graph illustrating an example of frequency spectral waveforms. The horizontal axis represents intermediate frequency, and the vertical axis represents spectral intensity. The signal processing unit 26 performs, on an analysis period basis, a range FFT for a plurality of analysis periods T1, T2, and T3 (FIG. 5A) corresponding to different frequency bands of the transmission chirp, and obtains frequency spectral waveforms of the intermediate frequency signal. The analysis periods T1, T2, and T3 are set so as to be included in respective periods when the first, second, and third partial chirps are transmitted.

The thick solid line, thin solid line, and dashed line in FIG. 5B represent frequency spectral waveforms based on respective intermediate frequency signals for the analysis periods T1, T2, and T3. Peaks appear near the intermediate frequencies IF1 and IF2 in each of the three frequency spectral waveforms. The positions of the peaks appearing near the intermediate frequency IF1 (hereinafter referred to as peak frequencies) have a large degree of variation among the frequency spectrum waveforms. The peak frequencies of the peaks appearing near the intermediate frequency IF2 have a small degree of variation among the frequency spectrum waveforms.

For example, the standard deviation can be used as an index to evaluate the degree of variation of peak frequency. Next, a method for calculating the index for evaluating the degree of variation will be described. In the following, a case will be described where the number of analysis periods is M. The peak frequency of a peak appearing near the intermediate frequency IFn of the frequency spectral waveform in each analysis period will be denoted as $f_{peak}[i, n]$. The degree of variation $f_{STD}[n]$ of the peak frequency of the peak appearing near the intermediate frequency IFn is defined, for example, by the following equation.

[Math. 1]

$$f_{STD}[n] = \sqrt{\frac{\sum_{i=1}^{M}\left(f_{peak}[i, n] - \frac{1}{M}\sum_{i=1}^{M} f_{peak}[i, n]\right)^2}{M}} \quad (1)$$

The peak frequency corresponds to the round-trip route length of radio waves to and from the object by which the radio waves are reflected. The variation of peak positions among the plurality of frequency spectral waveforms means that the round-trip route length of the radio waves varies with frequency. Thus, the peaks near the intermediate frequency IF1 having a large positional variation are considered to be due to multipath. In contrast, the peaks near the intermediate frequency IF2 having a small positional variation are considered to be due to direct waves. In this manner, on the basis of the degrees of variation of the peak frequency of the peaks appearing in the plurality of respective frequency spectral waveforms, peaks due to multipath can be excluded from distance measurement targets.

Figure 6:
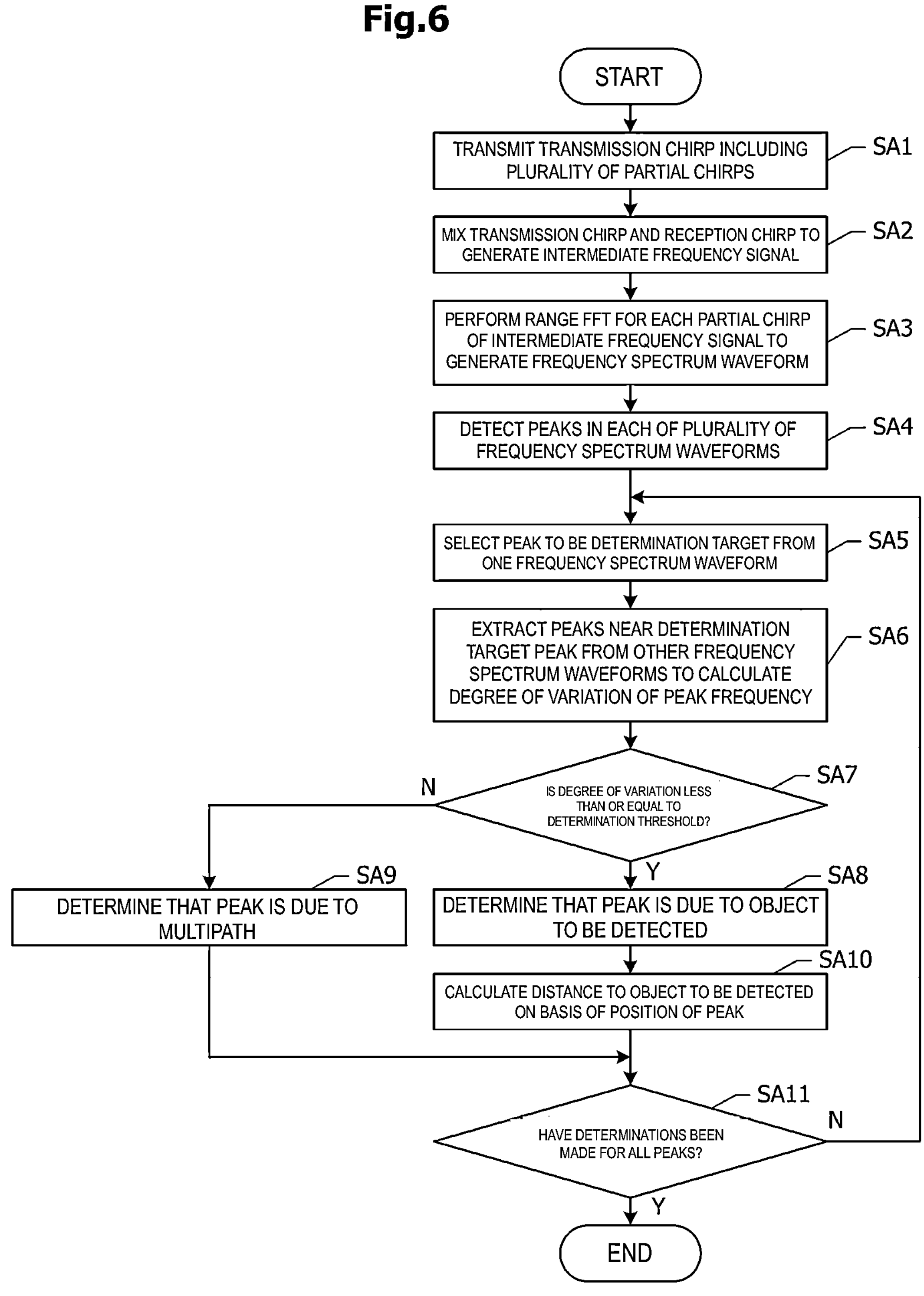
FIG. 6 is a flowchart illustrating the procedure of a distance calculation method performed by the radar apparatus according to the first embodiment.

Next, a distance calculation method performed by the radar apparatus 20 (FIG. 1) according to the first embodiment will be described with reference to FIG. 6. FIG. 6 is a flowchart illustrating the procedure of the distance calculation method performed by the radar apparatus 20 (FIG. 1) according to the first embodiment.

First, the transmission signal generation unit 21 (FIG. 1) generates a transmission chirp (FIG. 5A) including a plurality of partial chirps and transmits the transmission chirp from the transmission antenna 22Tx (FIG. 1) (Step SA1) Reflected waves that are waves reflected by the object 100 to be detected (FIG. 1) are received by the reception antenna 22Rx (FIG. 1). The mixer 24 (FIG. 1) mixes the transmission chirp and the reception chirp to generate an intermediate frequency signal (Step SA2).

The signal processing unit 26 performs a range FFT on the intermediate frequency signal for each partial chirp of the analysis periods T1, T2, and T3 (FIG. 5A) to generate a frequency spectral waveform (FIG. 5B) for each analysis period (Step SA3). Peaks of the plurality of generated frequency spectral waveforms are individually detected (Step SA4). Various known algorithms, such as the constant false alarm probability (CFAR) process, can be applied to detect the peaks. In the example illustrated in FIG. 5B, peaks are detected near the intermediate frequency IF1 and the intermediate frequency IF2 in each of the three frequency spectral waveforms.

The signal processing unit 26 selects one peak to be a determination target from among a plurality of peaks appearing in one frequency spectral waveform (Step SA5). Furthermore, the signal processing unit 26 extracts peaks near the determination target peak from the other frequency spectral waveforms, and calculates the degree of variation of the peak frequency of the determination target peak and the peaks near the determination target peak (Step SA6). For example, the signal processing unit 26 calculates a standard deviation expressed by Equation (1). When the signal processing unit 26 extracts peaks near the determination target peak, for example, in a case where the difference between the peak frequencies of two peaks is less than or equal to a predetermined proximity determination threshold, the signal processing unit 26 determines the peaks to be “near”. Note that the degree of variation may be, for example, a value obtained by normalizing, using the average peak frequency of the plurality of peaks, the difference between the highest and lowest peak frequencies of the plurality of peaks.

When the calculated degree of variation is less than or equal to the determination threshold, the signal processing unit 26 determines that the determination target peak and the peaks extracted from the other frequency spectral waveforms to be peaks due to the object to be detected (Steps SA7 and SA8). Furthermore, the signal processing unit 26 calculates the distance to the object to be detected, on the basis of the peak frequencies of these peaks (Step SA10).

When the calculated degree of variation is greater than the determination threshold, the signal processing unit 26 determines that the determination target peak and the peaks extracted from the other frequency spectral waveforms to be peaks due to multipath (Steps SA7 and SA9). The determination threshold may be set to an appropriate value depending on the grounding environment of the transmission antenna 22Tx and the reception antenna 22Rx.

After performing Step SA9 or SA10, the signal processing unit 26 repeats the procedure from Step SA5 until the signal processing unit 26 has performed determination processing for all the peaks (Step SA1*l*). Note that, in Step SA6, the peaks subjected to calculation of the degree of variation are treated as those for which determination processing has been completed.

In Step SA6, in a case where a peak or peaks near the determination target peak cannot be extracted from at least one of the frequency spectral waveforms different from the frequency spectral waveform from which the determination target peak has been selected, it is sufficient that the determination target peak be determined to be a peak due to multipath.

Next, advantageous effects of the first embodiment will be described.

In the first embodiment, the reflective structures 35 (FIG. 2) including metasurfaces are arranged along the route where multipath may occur, so that the multipath route length changes with frequency. Peaks due to multipath can be detected using the variation of the peak frequency of the peaks appearing in the frequency spectral waveforms of the intermediate frequency signal as the multipath route length changes. Thus, even in a case where the distance from the radar apparatus 20 to the object 100 to be detected (FIG. 1) does not change over time, multipath effects can be detected as being present and then eliminated, and the distance to the object 100 to be detected can be measured.

In the first embodiment, some of the frequency bands of the plurality of partial chirps (FIG. 5A) included in the transmission chirp overlap, and the analysis periods T1, T2, and T3 are set for the plurality of respective partial chirps. Thus, the frequency bandwidth of each partial chirp is wider than in a case where the plurality of analysis periods T1, T2, and T3 are set for a single transmission chirp whose frequency changes continuously. This can increase the resolution of peaks appearing in the frequency spectral waveforms. This has an excellent effect in that a reduction in the accuracy of distance measurement to the object 100 to be detected is suppressed.

Next, a modification of the first embodiment will be described.

In the first embodiment, the reflective structures 35 are attached to both the vehicle body 50 and the exterior 51 of the vehicle body illustrated in FIG. 2; however, the reflective structures 35 may be attached to only one out of the vehicle body 50 and the exterior 51 of the vehicle body. Moreover, the first embodiment describes an example in which the radar apparatus 20 (FIG. 2) is mounted on a moving object; however, the radar apparatus 20 according to the first embodiment can be mounted on various structures other than moving objects and used.

The radar apparatus 20 according to the first embodiment includes one transmission antenna 22Tx and one reception antenna 22Rx; however, the radar apparatus 20 according to the first embodiment may be equipped with a plurality of transmission antennas 22Tx or a plurality of reception antennas 22Rx. This allows the distance to the object to be detected and the direction in which the object to be detected is present to be detected.

Second Embodiment

Next, a radar apparatus according to a second embodiment will be described with reference to the drawings from FIGS. 7A to 7D. In the following, description of configurations common to those of the radar apparatus according to the first embodiment described with reference to the drawings from FIGS. 1 to 6 will be omitted.

Figures 7A, 7D:
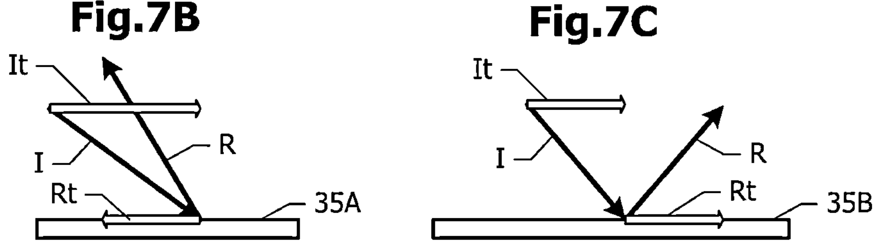
FIG. 7A is a schematic cross-sectional view illustrating a radar apparatus according to a second embodiment and part of a moving object equipped with the radar apparatus.
FIG. 7D is a graph illustrating the frequency dependence of reflection phases of metasurfaces of reflective structures and a reflection phase of a metal surface of a reflective structure.

FIG. 7A is a schematic cross-sectional view illustrating a radar apparatus 20 (FIG. 1) according to the second embodiment and part of a moving object equipped with the radar apparatus 20. In the first embodiment (FIG. 2), the details of the reflection characteristics of the plurality of reflective structures 35 attached to the vehicle body 50 and the exterior 51 of the vehicle body are not specifically limited. In contrast, in the second embodiment, the reflection characteristics at the reflective surfaces of the plurality of reflective structures 35 are limited in more detail.

On the vehicle body 50, reflective structures 35A, 35B, and 35C are arranged in this order in the direction away from the transmission antenna 22Tx and the reception antenna 22Rx of the radar apparatus 20. When the radar apparatus 20 is viewed from the center of the field of view 40, for example, each of the reflective structures 35A, 35B, and 35C has a circular shape along concentric circles centered on the radar apparatus 20. The reflective structures 35A and 35C include metasurfaces, and the reflective structure 35B includes a metal surface. The metasurfaces and metal surface of the reflective structures 35A, 35B, and 35C attached to the vehicle body 50 face in the same direction as the radiation direction of the transmission antenna 22Tx (FIG. 1) included in the radar apparatus 20.

FIG. 7B is a schematic diagram for describing the reflection characteristics of the reflective structure 35A arranged at the closest position to the radar apparatus 20. An incident wave I in the frequency band of the transmission chirp (FIG. 5A) is incident on the reflective structure 35A. A component It of the incident wave I parallel to the metasurface in the direction of propagation of the incident wave I (hereinafter referred to as a tangential component) and a tangential component Rt of a reflected wave R in the direction of propagation of the reflected wave R are in opposite directions. In other words, when the vehicle body 50 is viewed in a plan view, the incident wave incident on the reflective structure 35A toward the direction approaching the radar apparatus 20 is reflected in a direction away from the radar apparatus 20.

FIG. 7C is a schematic diagram for describing the reflection characteristics of the reflective structure 35B having a metal surface. Regarding the reflective structure 35B, a tangential component It of an incident wave I in the direction of propagation of the incident wave I and a tangential component Rt of a reflected wave R in the direction of propagation of the reflected wave R are in the same direction. In other words, when the vehicle body 50 is viewed in a plan view, the incident wave incident on the reflective structure 35B toward the direction away from the radar apparatus 20 is reflected in a direction away from the radar apparatus 20.

Regarding the reflective structure 35C, the tangential component of an incident wave in the direction of propagation of the incident wave and the tangential component of a reflected wave in the direction of propagation of the reflected wave are in the same direction or opposite directions, depending on frequency in the frequency band of the transmission chirp (FIG. 5A).

Reflective structures 35D and 35E are attached to the exterior 51 of the vehicle body. When the vehicle body 50 is viewed in a plan view, the reflective structure 35D is arranged at a position closer to the radar apparatus 20 than the reflective structure 35E is. The reflective structure 35D and the reflective structure 35E have the same reflection characteristics as the reflective structure 35B and the reflective structure 35C, respectively.

FIG. 7D is a graph illustrating the frequency dependence of the reflection phases $\varphi_{msa}$ and $\varphi_{msc}$ of the metasurfaces of the reflective structures 35A and 35C and the reflection phase $\varphi_{met}$ of the metal surface of the reflective structure 35B. The horizontal axis represents frequency, and the vertical axis represents reflection phase. The thickest solid line, the second thickest solid line, and the thinnest solid line in FIG. 7D illustrate the reflection phase $\varphi_{msa}$ at the metasurface of the reflective structure 35A, the reflection phase $\varphi_{msc}$ at the metasurface of the reflective structure 35C, and the reflection phase $\varphi_{met}$ at the metal surface of the reflective structure 35B, respectively.

The amount of change of the reflection phase $\varphi_{msa}$ at the metasurface included in the reflective structure 35A is less than that of the reflection phase $\varphi_{msc}$ at the metasurface included in the reflective structure 35C. The reflective structure 35A has a reflection phase $\varphi_{msa}$ such that the reflection characteristics described above are satisfied at any of the center frequencies $f_1$, $f_2$, and $f_3$ of the three partial chirps (FIG. 5A) in the transmission chirp. The reflective structure 35C has a reflection phase $\varphi_{msc}$ such that the reflection characteristics described above are satisfied at at least one of the center frequencies $f_1$, $f_2$, and $f_3$. The reflection phase $\varphi_{met}$ at the metal surface of the reflective structure 35B is constant regardless of frequency.

Next, advantageous effects of the second embodiment will be described.

In the second embodiment, reflected waves from a radio wave reflector travel along the multipath route, and when the reflected waves are incident on the reflective structure 35A, the reflected waves are reflected in directions away from the radar apparatus 20. When the direct or indirect waves of the transmission chirp are incident on the reflective structures 35B, 35C, 35D, and 35E, the incident waves are reflected in directions away from the radar apparatus 20. In this manner, the radio waves propagating along the multipath route are reflected in the directions away from the radar apparatus 20, thereby reducing multipath effects.

Third Embodiment

Next, a radar apparatus and a moving object according to a third embodiment will be described with reference to the drawings from FIGS. 8 to 11. In the following, description of configurations common to those of the radar apparatus according to the first embodiment described with reference to the drawings from FIGS. 1 to 6 will be omitted.

Figure 8:
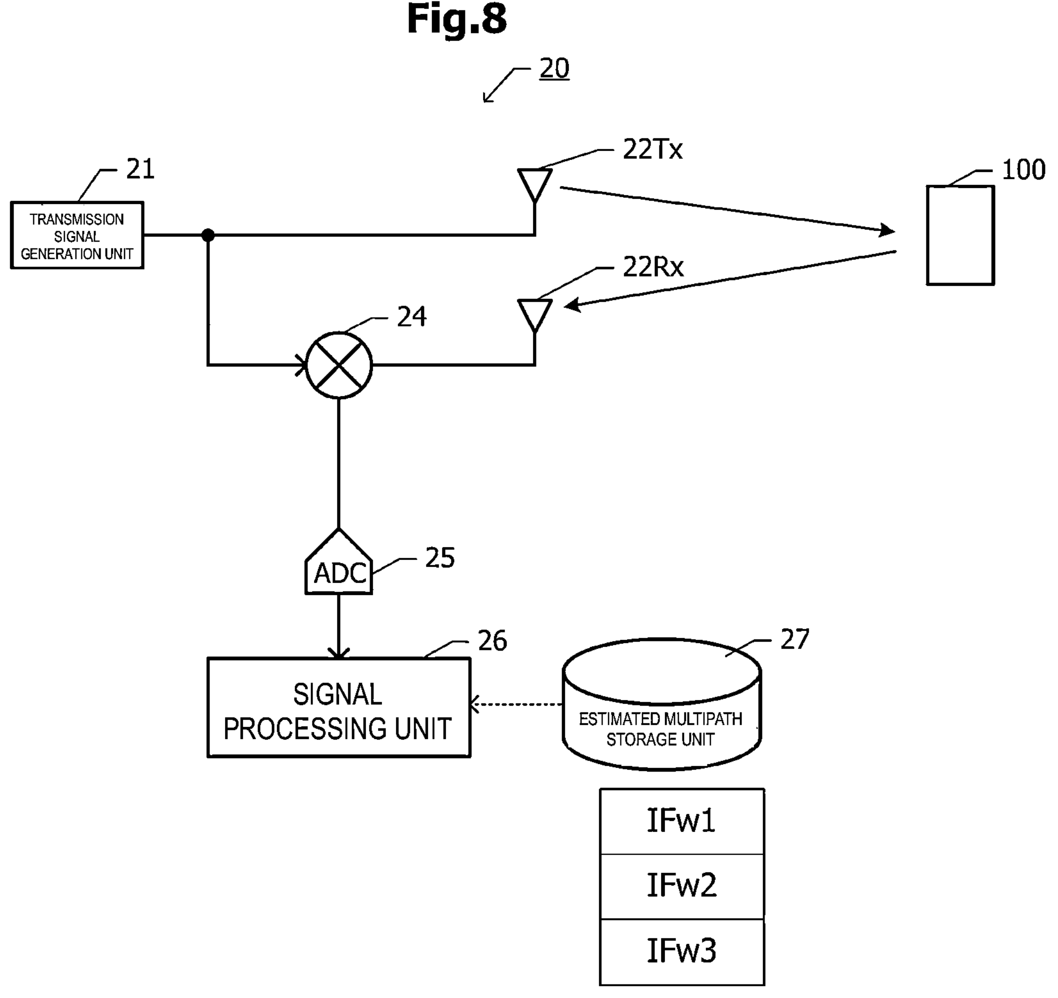
FIG. 8 is a schematic diagram of a radar apparatus according to a third embodiment.

FIG. 8 is a schematic diagram of a radar apparatus 20 according to the third embodiment. The radar apparatus 20 according to the third embodiment includes an estimated multipath storage unit 27 in addition to the radar apparatus 20 (FIG. 1) according to the first embodiment. The estimated multipath storage unit 27 stores intermediate frequency bands IFw1, IFw2, and IFw3 corresponding to estimated multipath route lengths. Note that the number of stored intermediate frequency bands is not limited to three. The transmission antenna 22Tx and the reception antenna 22Rx are incorporated in the radar apparatus 20.

Figure 9A:
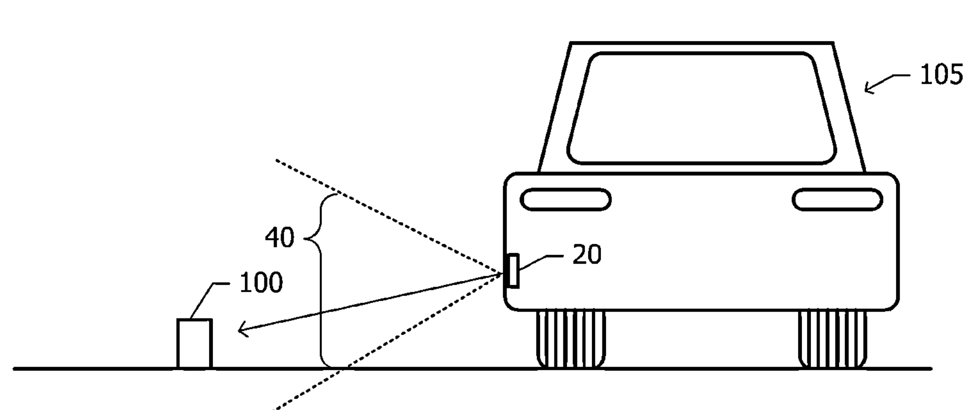
FIG. 9A is a schematic diagram of a moving object equipped with a radar apparatus.

FIG. 9A is a schematic diagram of a moving object 105 equipped with the radar apparatus 20. The moving object 105 is, for example, a four-wheeled vehicle. The radar apparatus 20 is mounted on or in a side surface of the moving object 105, and the field of view 40 of the radar apparatus 20 faces to the side of the moving object 105. For example, the object 100 to be detected, such as a curb, is located to the side of the moving object 105, and the object 100 to be detected is included in the field of view 40. Note that a plurality of radar apparatuses 20 may be mounted so that the field of view 40 faces forward or backward of the moving object 105.

Figure 9B:
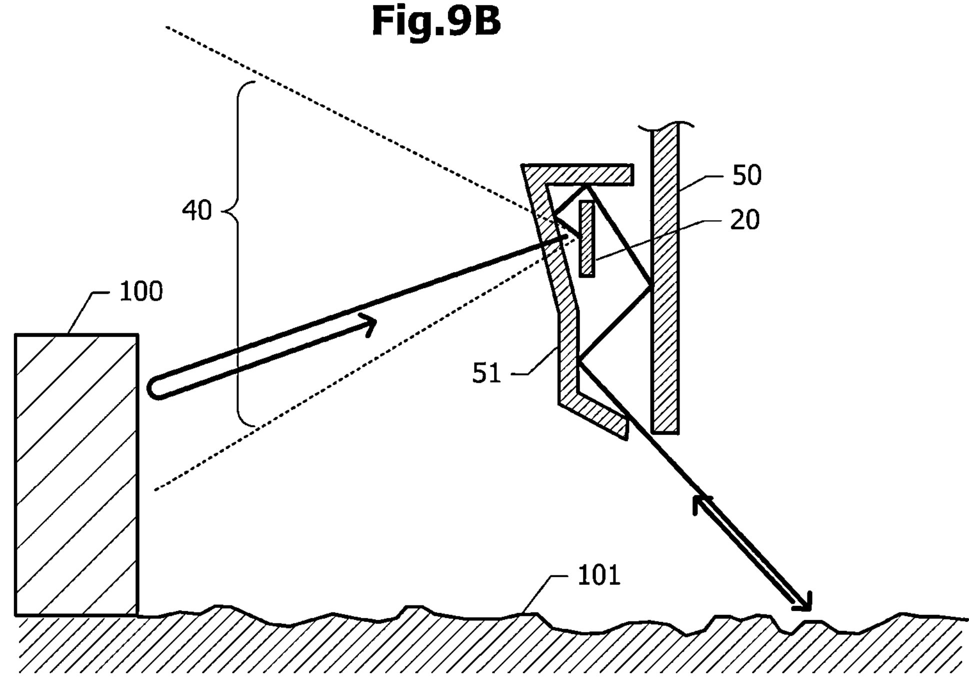
FIG. 9B is an enlarged schematic cross-sectional view of a portion where the radar apparatus is mounted.

FIG. 9B is an enlarged schematic cross-sectional view of a portion where the radar apparatus 20 is mounted. A space is secured between the vehicle body 50 and the exterior 51 of the vehicle body, and the radar apparatus 20 is arranged in this space. The direct waves transmitted from the transmission antenna 22Tx (FIG. 8) of the radar apparatus 20 to the object 100 to be detected are reflected by the object 100 to be detected and directly reach the reception antenna 22Rx (FIG. 8) of the radar apparatus 20.

Some of the radio waves transmitted from the transmission antenna 22Tx of the radar apparatus 20 are reflected a plurality of times by the surface of the exterior 51 of the vehicle body and the surface of the vehicle body 50 and are incident on ground 101. The reflected waves from the ground 101 are received by the reception antenna 22Rx of the radar apparatus 20 along the route in the opposite direction of the transmitted waves. The length of this multipath route can be estimated using the shapes of the vehicle body 50 and the exterior 51 of the vehicle body and the height from the ground 101 to the radar apparatus 20. The intermediate frequency bandwidth corresponding to the estimated length of this multipath route is stored in the estimated multipath storage unit 27 (FIG. 8). This intermediate frequency band is used as position information that indicates the positions of the peaks generated in the frequency spectral waveforms due to multipath effects.

Next, the procedure performed by the signal processing unit 26 of the radar apparatus 20 according to the third embodiment will be described. The procedure performed by the signal processing unit 26 of the radar apparatus 20 according to the third embodiment differs from the procedure performed in the first embodiment (FIG. 6) in the processing of Step SA7, while the other steps are identical.

Figures 10, 11:
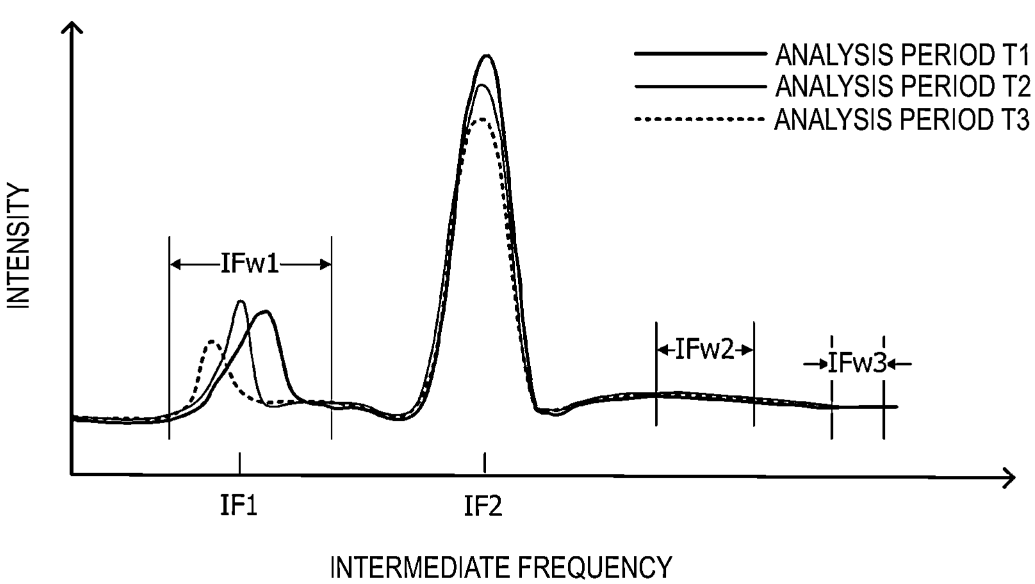
FIG. 10 is a flowchart illustrating the procedure in Step SA7 (FIG. 6) performed by a signal processing unit of the radar apparatus according to the third embodiment.
FIG. 11 is a graph illustrating frequency spectral waveforms generated by the signal processing unit of the radar apparatus according to the third embodiment for respective analysis periods T1, T2, and T3 (FIG. 5A).

FIG. 10 is a flowchart illustrating the procedure in Step SA7 performed by the signal processing unit 26 (FIG. 8) of the radar apparatus 20 according to the third embodiment. The signal processing unit 26 determines whether or not the determination target peak selected in Step SA5 (FIG. 6) is included in an intermediate frequency band corresponding to an estimated multipath route length stored in the estimated multipath storage unit 27 (FIG. 8) (Step SA71). In a case where the determination target peak is included in an intermediate frequency band corresponding to an estimated multipath route length, the determination threshold for the degree of variation is made lower than the initial value (Step SA72). Thereafter, the degree of variation of the plurality of peaks is determined on the basis of the determination threshold (Step SA73). In a case where the determination target peak is not included in the intermediate frequency band corresponding to the estimated multipath route length, the degree of variation of the plurality of peaks is determined on the basis of the initial determination threshold (Step SA73).

FIG. 11 is a graph illustrating the frequency spectral waveforms generated by the signal processing unit 26 (FIG. 8) for the respective analysis periods T1, T2, and T3 (FIG. 5A) and is identical to FIG. 5B. In a case where the determination target peak is included in any one out of the intermediate frequency bands IFw1, IFw2, and IFw3 corresponding to estimated multipath route lengths, the determination threshold for the degree of variation is reduced. In other words, even when the variation is smaller, the determination target peak is determined to be due to multipath. In the example illustrated in FIG. 11, the peaks near the intermediate frequency IF1 are included in the intermediate frequency band IFw1 corresponding to an estimated multipath route length, and the peaks near the intermediate frequency IF2 are not included in any of the intermediate frequency bands corresponding to the estimated multipath route lengths.

Next, advantageous effects of the third embodiment will be described.

In the third embodiment, it is easier to correctly determine peaks that are estimated to be due to multipath as being due to multipath. This suppresses the possibility that a peak due to multipath is erroneously determined as being due to the object 100 to be detected.

Next, a radar apparatus according to a modification of the third embodiment will be described. In the third embodiment, in a case where the determination target peak is not included in the intermediate frequency bands stored in the estimated multipath storage unit 27, the degree of variation of the peak is determined on the basis of the initial determination threshold. In contrast, in this modification, in a case where the determination target peak is not included in the intermediate frequency bands stored in the estimated multipath storage unit 27, a plurality of peaks are determined to be due to the object 100 to be detected (FIG. 8) without determining the degree of variation of these peaks.

Even in this modification, the possibility is suppressed that a peak due to multipath is erroneously determined as being due to the object 100 to be detected. Furthermore, in a case where the determination target peak is not included in the intermediate frequency bands stored in the estimated multipath storage unit 27, the degree of variation of the plurality of peaks is not determined, thereby allowing the load on the signal processing unit 26 to be reduced.

Fourth Embodiment

Next, a radar apparatus according to a fourth embodiment will be described with reference to FIG. 12. In the following, description of configurations common to those of the radar apparatus according to the first embodiment described with reference to the drawings from FIGS. 1 to 6 will be omitted.

Figure 12:
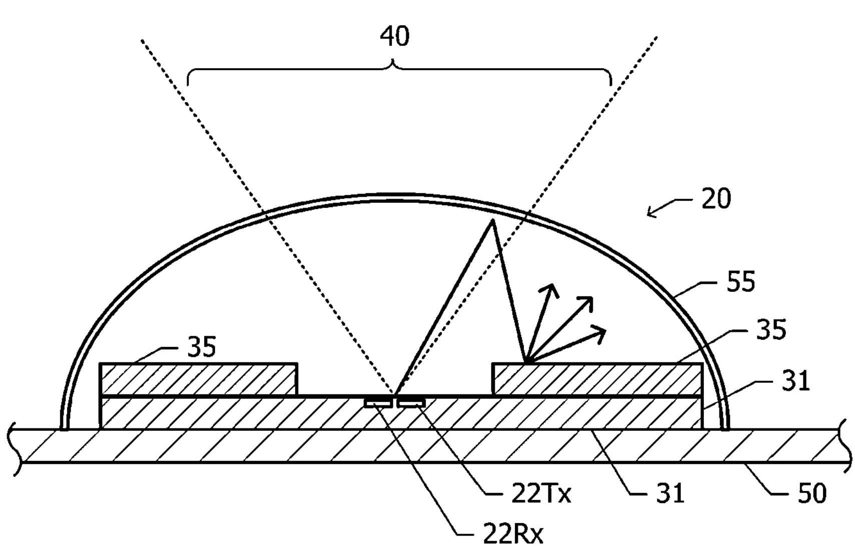
FIG. 12 is a schematic diagram of a radar apparatus according to a fourth embodiment.

FIG. 12 is a schematic diagram of a radar apparatus 20 according to the fourth embodiment. The transmission antenna 22Tx and the reception antenna 22Rx are provided on an antenna substrate 31. The antenna substrate 31 is mounted on the vehicle body 50. The field of view 40 of the radar apparatus 20 faces outward from the vehicle body 50. When the antenna substrate 31 is viewed in a plan view, the reflective structure 35 including a metasurface is attached to the antenna substrate 31 so as to surround the transmission antenna 22Tx and the reception antenna 22Rx. The reflective structure 35 has substantially the same reflection characteristics as the reflective structure 35A or 35C used in the radar apparatus 20 according to the second embodiment illustrated in FIG. 7A.

A radome 55 is attached such that the radome 55 covers the antenna substrate 31. The transmission chirp transmitted from the transmission antenna 22Tx is transmitted through the radome 55 and propagates to the outside. The reflected waves from the object 100 to be detected (FIG. 1) are transmitted through the radome 55 and reach the reception antenna 22Rx.

Next, advantageous effects of the fourth embodiment will be described.

Part of the transmission chirp transmitted from the transmission antenna 22Tx is reflected by the radome 55 and incident on the reflective structure 35. The transmission chirp reflected by the radome 55 is the cause of occurrence of multipath. Since the reflective structure 35 has reflection characteristics that change the direction of propagation of reflected waves in accordance with frequency, multipath effects are eliminated, and the distance to the object 100 to be detected can be calculated similarly to as in the first embodiment.

Fifth Embodiment

Next, a radar apparatus according to a fifth embodiment will be described with reference to the drawings from FIGS. 13A to 15. In the following, description of configurations common to those of the radar apparatus according to the first embodiment described with reference to the drawings from FIGS. 1 to 6 will be omitted.

The transmission signal generation unit 21 (FIG. 1) of a radar apparatus 20 according to the fifth embodiment generates two types of transmission chirps: one for multipath detection and the other for target detection.

Figure 13A:
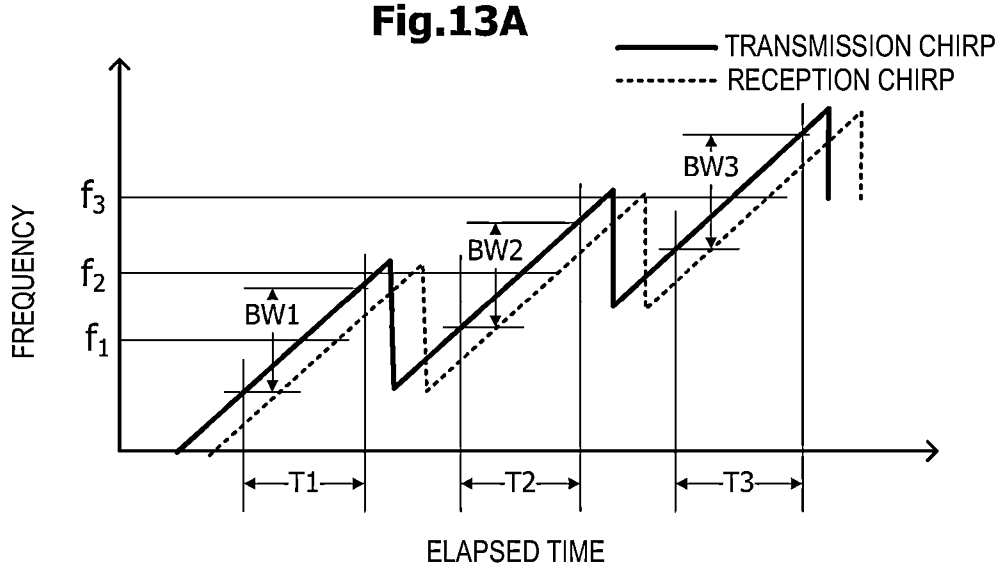
FIG. 13A is a graph illustrating temporal changes in the frequencies of a transmission chirp for multipath detection and a reception chirp delayed from the transmission chirp.

FIG. 13A is a graph illustrating temporal changes in the frequencies of a transmission chirp for multipath detection and a reception chirp delayed from the transmission chirp. In FIG. 13A, the transmission chirp and the reception chirp are illustrated by the solid line and the dashed line, respectively. The transmission chirp for multipath detection includes a plurality of partial chirps, similarly to the transmission chirp generated by the transmission signal generation unit 21 of the radar apparatus 20 according to the first embodiment illustrated in FIG. 5A. The transmission chirp for multipath detection includes partial chirps for the respective analysis periods T1, T2, and T3. The frequency bandwidths of the partial chirps corresponding to the analysis periods T1, T2, and T3 are denoted by BW1, BW2, and BW3.

Figure 13B:
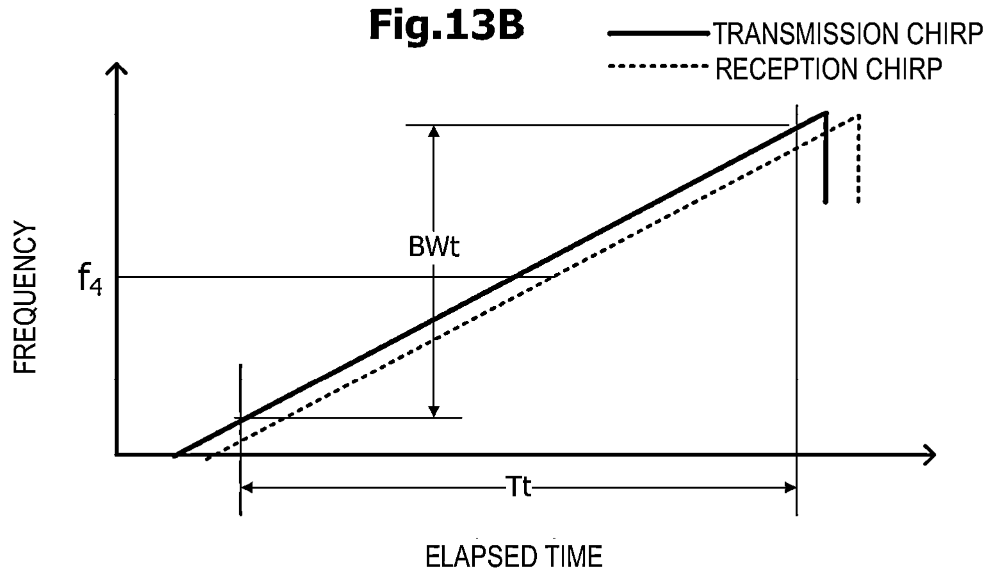
FIG. 13B is a graph illustrating temporal changes in the frequencies of a transmission chirp for target detection and a reception chirp delayed from the transmission chirp.

FIG. 13B is a graph illustrating temporal changes in the frequencies of a transmission chirp for target detection and a reception chirp delayed from the transmission chirp. In FIG. 13B, the transmission chirp and the reception chirp are illustrated by the solid line and the dashed line, respectively. The frequency of the transmission chirp for target detection increases continuously and linearly during an analysis period Tt. The frequency bandwidth of the transmission chirp during the analysis period Tt is denoted by BWt.

The frequency bandwidth BWt of the transmission chirp for target detection is wider than any one of the frequency bandwidths BW1, BW2, and BW3 of the respective partial chirps included in the transmission chirp for multipath detection. A center frequency $f_4$ of the frequency band of the transmission chirp for target detection is equal to the center frequency $f_2$ of the frequency band of the second partial chirp of the transmission chirp for multipath detection. Note that these center frequencies do not necessarily need to be equal to each other.

The signal processing unit 26 (FIG. 1) performs a range FFT on each partial chirp included in the transmission chirp for multipath detection and also performs a range FFT on the transmission chirp for target detection. This generates the same number of frequency spectral waveforms as the number of partial chirps on the basis of the transmission chirp for multipath detection and also one frequency spectral waveform on the basis of the transmission chirp for target detection.

Figure 14:
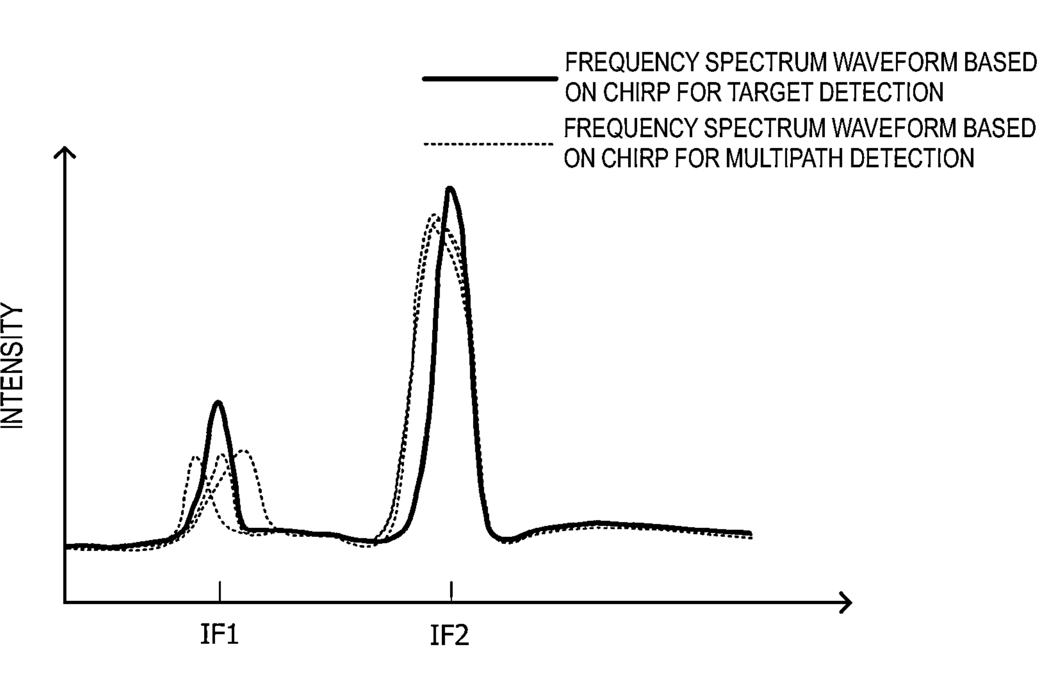
FIG. 14 is a graph illustrating an example of frequency spectral waveforms generated by a signal processing unit of the radar apparatus according to the fifth embodiment.

FIG. 14 is a graph illustrating an example of frequency spectral waveforms generated by the signal processing unit 26. The three dashed lines illustrated in FIG. 14 illustrate the frequency spectral waveforms generated for the respective partial chirps included in the transmission chirp for multipath detection. These waveforms are identical to the three frequency spectral waveforms illustrated in FIG. 5B of the first embodiment. The single solid line illustrated in FIG. 14 illustrates the frequency spectral waveform generated on the basis of the transmission chirp for target detection.

In any of the frequency spectral waveforms, peaks appear near the intermediate frequencies IF1 and IF2. Since the frequency bandwidth BWt of the transmission chirp for target detection (FIG. 13B) is wider than any one of the frequency bandwidths BW1, BW2, and BW3 of the partial chirps included in the transmission chirp for multipath detection, the resolution of the peaks of the frequency spectral waveform based on the transmission chirp for target detection is higher than the resolution of the peaks of the frequency spectral waveform for each partial chirp included in the transmission chirp for multipath detection.

FIG. 15 is a flowchart illustrating the procedure of a distance calculation method performed by the radar apparatus 20 (FIG. 1) according to the fifth embodiment.

First, the transmission signal generation unit 21 (FIG. 1) generates a transmission chirp for multipath detection and transmits the transmission chirp from the transmission antenna 22Tx (Step SA1*a*). The mixer 24 (FIG. 1) mixes the transmission chirp for multipath detection and the reception chirp to generate an intermediate frequency signal (Step SA2*a*). The transmission signal generation unit 21 (FIG. 1) generates a transmission chirp for target detection and transmits the transmission chirp from the transmission antenna 22Tx (Step SA1*b*). The mixer 24 (FIG. 1) mixes the transmission chirp for target detection and the reception chirp to generate an intermediate frequency signal (Step SA2*b*).

Thereafter, the signal processing unit 26 (FIG. 1) performs a range FFT on each partial chirp included in the transmission chirp for multipath detection and on the transmission chirp for target detection, and generates a plurality of frequency spectral waveforms (FIG. 14) (Step SA3*a*). The signal processing unit 26 detects peaks of each of the frequency spectral waveforms based on the transmission chirp for multipath detection and the frequency spectral waveform based on the transmission chirp for target detection (Step SA4*a*).

The signal processing unit 26 selects a determination target peak from one frequency spectral waveform based on the transmission chirp for multipath detection (Step SA5*a*). The signal processing unit 26 extracts peaks near the determination target peak from the other frequency spectral waveforms based on the transmission chirp for multipath detection and calculates the degree of variation of the positions of the peaks (Step SA6*a*).

Subsequent Steps SA7, SA8, and SA9 are identical to Steps SA7, SA8, and SA9 of the flowchart of the first embodiment illustrated in FIG. 6. In a case where the peak is determined to be due to the object 100 to be detected (FIG. 1) in Step SA8, a peak near the determination target peak is extracted from the frequency spectral waveform based on the transmission chirp for target detection, and the distance to the object 100 to be detected (FIG. 1) is calculated on the basis of the extracted peak (Step SA10*a*).

The signal processing unit 26 repeats the procedure in and after Step SA5*a* until determination processing is completed for all peaks appearing in the frequency spectral waveforms based on the transmission chirp for multipath detection (Step SA11).

Next, advantageous effects of the fifth embodiment will be described.

Even in the fifth embodiment, similarly to as in the first embodiment, even in a case where the distance from the radar apparatus 20 to the object 100 to be detected (FIG. 1) does not change over time, multipath effects can be eliminated, and the distance to the object 100 to be detected can be measured. Furthermore, since the distance to the object 100 to be detected is calculated on the basis of the transmission chirp for target detection (FIG. 13B) having a wide frequency bandwidth BWt, distance resolution can be improved compared to that of the first embodiment.

[Specific Examples of Metasurfaces]

Next, specific examples of metasurfaces will be described with reference to the drawings from FIGS. 16A to 17E.

Figure 16A:
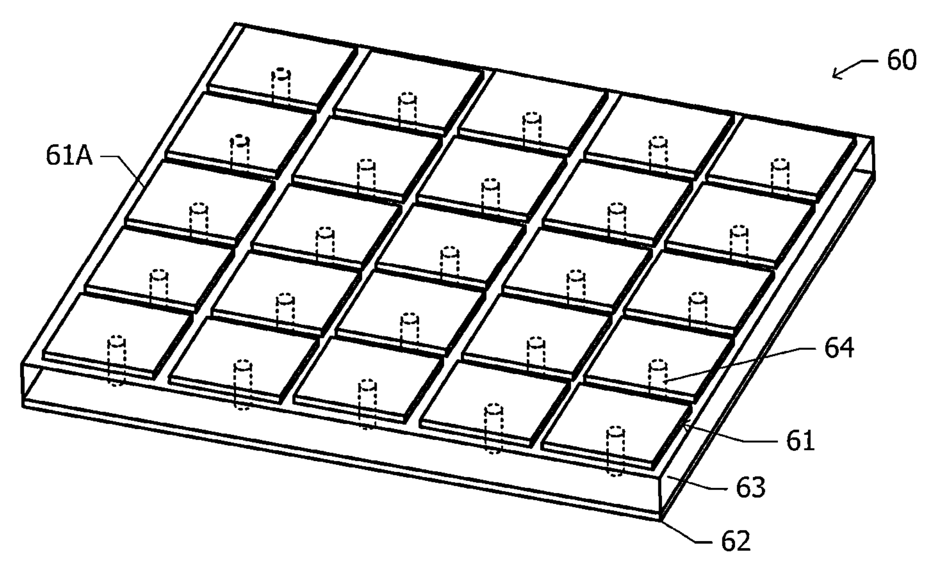
FIGS. 16A, 16B, and 16C are a perspective view, a cross-sectional view, and a plan view, respectively, of a portion of a metasurface according to one specific example.
Figure 16B:
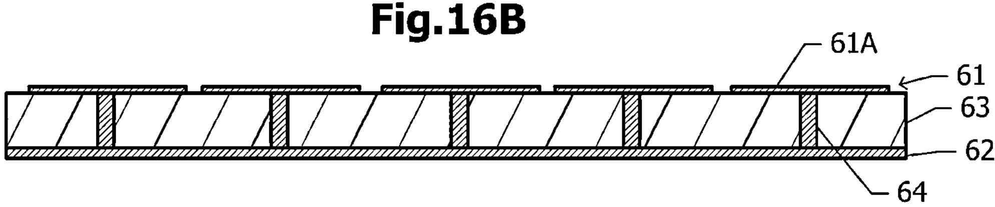
Figure 16C:
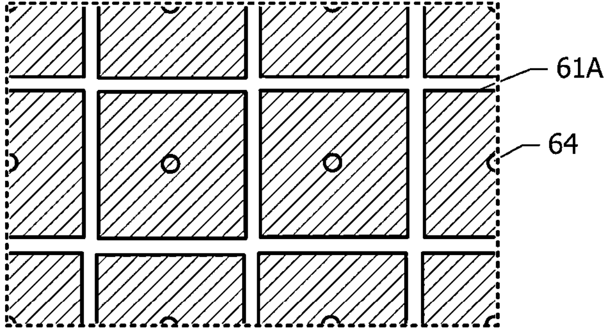

FIGS. 16A, 16B, and 16C are a perspective view, a cross-sectional view, and a plan view, respectively, of a portion of a metasurface 60 according to one specific example. In FIG. 16C, metal portions are hatched. The metasurface 60 includes a frequency selective surface 61 (FSS), a ground plate 62, a dielectric layer 63, and a plurality of vias 64. The frequency selective surface 61 is arranged on one surface of the dielectric layer 63, and the ground plate 62 is arranged on the other surface. The frequency selective surface 61 is formed by a plurality of rectangular metal elements 61A arranged in a two-dimensional periodic manner. The dimensions of each of the plurality of metal elements 61A are smaller than the wavelength of the transmission chirp. The metal elements 61A are connected to the ground plate with the respective vias 64 interposed therebetween. Such a metasurface is called a mushroom metasurface.

The drawings from FIGS. 17A to 17E are plan views of portions of metasurfaces according to other specific examples. In the drawings from FIGS. 17A to 17E, metal portions are hatched. In the specific example illustrated in FIG. 17A, the metal elements 61A are circular. In the specific example illustrated in FIG. 17B, the metal elements 61A are hexagonal.

Regarding the metasurfaces illustrated in FIGS. 17C, 17D, and 17E, the metal elements 61A of the frequency selective surface and the ground plate 62 are not connected by vias. Such a metasurface is called an FSS metasurface. In any one of FIGS. 17C, 17D, and 17E, a two-dimensional periodic pattern is formed by the metal elements 61A.

As the metasurfaces included in the reflective structures 35 of the radar apparatuses 20 (FIG. 1) according to the first to fifth embodiments described above, the metasurface illustrated in any one of the drawings from FIGS. 16A to 17E may be used.

Sixth Embodiment

Next, a radar apparatus according to a sixth embodiment will be described with reference to FIG. 18A. In the following, description of configurations common to those of the radar apparatus according to the first embodiment described with reference to the drawings from FIGS. 1 to 6 will be omitted.

Figure 18A:
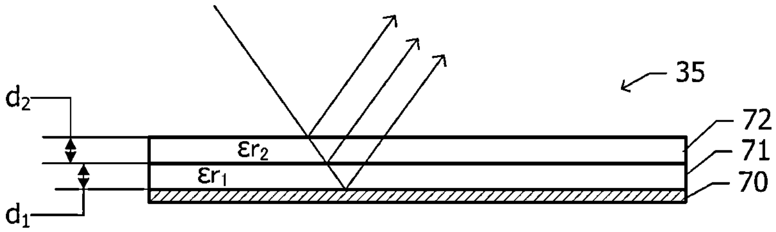
FIG. 18A is a cross-sectional view of a reflective structure used in a radar apparatus according to a sixth embodiment.

FIG. 18A is a cross-sectional view of a reflective structure 35 used in a radar apparatus 20 according to the sixth embodiment. The reflective structures 35 (FIG. 2) of the radar apparatus 20 according to the first embodiment include metasurfaces. In contrast, the reflective structure 35 of the radar apparatus 20 according to the sixth embodiment has a dielectric multilayer structure. On a ground plate 70, dielectric layers 71 and 72 having different dielectric constants are stacked in this order. The relative dielectric constants of the dielectric layers 71 and 72 are denoted by $\varepsilon_{r1}$ and $\varepsilon_{r2}$ in a respective manner. The thicknesses of the dielectric layers 71 and 72 are denoted by $d_1$ and $d_2$ in a respective manner.

Radio waves incident on the reflective structure 35 are reflected at the surface of the dielectric layer 72, the interface between the dielectric layers 72 and 71, and the interface between the dielectric layer 71 and the ground plate 70. The directions of propagation of composite waves of these reflected waves change with the relative dielectric constants $\varepsilon_{r1}$ and $\varepsilon_{r2}$ and thicknesses $d_1$ and $d_2$ of the dielectric layers 71 and 72, and the directions of propagation of the reflected waves change depending on frequency.

Next, advantageous effects of the sixth embodiment will be described.

As in the sixth embodiment, the directions of propagation of the reflected waves can be changed with frequency even when the dielectric multilayer structure is used as the reflective structure 35. Thus, even in the sixth embodiment, similarly to as in the first embodiment, even in a case where the distance from the radar apparatus 20 to the object 100 to be detected (FIG. 1) does not change over time, multipath effects can be eliminated, and the distance to the object 100 to be detected can be measured.

Figure 18B:
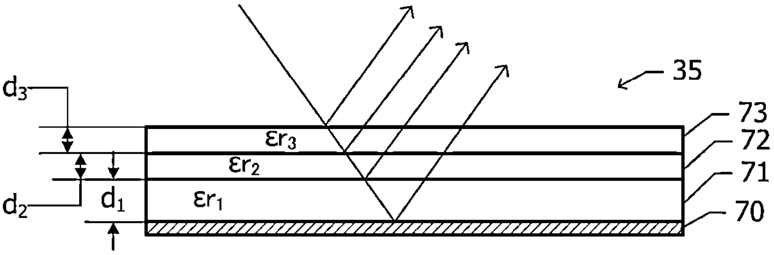
FIG. 18B is a cross-sectional view of a reflective structure used in a radar apparatus according to a modification of the sixth embodiment.

Next, a radar apparatus according to a modification of the sixth embodiment will be described with reference to FIG. 18B. FIG. 18B is a cross-sectional view of a reflective structure 35 used in a radar apparatus 20 according to a modification of the sixth embodiment. In this modification, three dielectric layers 71, 72, and 73 are stacked in this order on the ground plate 70. A dielectric constant $\varepsilon_{r3}$ of the dielectric layer 73, which is the topmost layer, is different from the dielectric constant $\varepsilon_{r2}$ of the dielectric layer 72, which is the second layer. The thickness of the dielectric layer 73, which is the topmost layer, is denoted by $d_3$.

As in this modification, the three dielectric layers 71, 72, and 73 may be included in a dielectric multilayer structure. Furthermore, the dielectric multilayer structure may include four or more dielectric layers.

Based on the above-described embodiments described in this specification, at least the following is disclosed.

<1>

A radar apparatus including:

a transmission signal generation unit that generates a transmission chirp, a transmission antenna that transmits the transmission chirp, a reception antenna that receives a reflected wave, from an object to be detected, of the transmission chirp transmitted from the transmission antenna, a mixer that mixes the transmission chirp and a reception chirp received by the reception antenna to generate an intermediate frequency signal, and a signal processing unit that performs processing on the intermediate frequency signal, and the signal processing unit obtains, for a plurality of respective analysis periods corresponding to different frequency bands of the transmission chirp, frequency spectral waveforms of the intermediate frequency signal, detects a peak appearing in the plurality of frequency spectral waveforms, and determines, based on variations in peak position among the plurality of frequency spectral waveforms, whether or not the peak is due to a valid object.

<2>

The radar apparatus described in <1>, further including a reflective structure arranged at a position outside a field of view of the radar apparatus and on which a radio wave transmitted from the transmission antenna is incident, and the reflective structure includes a metasurface that reflects a radio wave in a frequency band of the transmission chirp.

<3>

The radar apparatus described in <2>, in which the metasurface of the reflective structure faces in same direction as a direction of radiation of the transmission antenna, and the reflective structure has a characteristic that a component of an incident wave parallel to the metasurface in a direction of propagation of the incident wave and a component of a reflected wave parallel to the metasurface in a direction of propagation of the reflected wave are in opposite directions in the frequency band of the transmission chirp, and the reflective structure further has a reflective surface in a region that is farther from the transmission antenna and the reception antenna than the metasurface of the reflective structure is when the metasurface of the reflective structure is viewed in a plan view, the reflective structure having a characteristic that a component of an incident wave parallel to the metasurface in a direction of propagation of the incident wave and a component of a reflected wave parallel to the metasurface in a direction of propagation of the reflected wave are in an identical direction at at least part of frequencies of the frequency band of the transmission chirp.

<4>

The radar apparatus described in <1>, further including: a reflective structure arranged at a position outside a field of view of the radar apparatus and on which a radio wave transmitted from the transmission antenna is incident, and the reflective structure includes a dielectric multilayer structure that reflects a radio wave in the frequency band of the transmission chirp.

<5>

The radar apparatus described in <1>, further including: a reflective structure arranged at a position outside a field of view of the radar apparatus and on which a radio wave transmitted from the transmission antenna is incident, and the reflective structure has a characteristic that a direction of propagation of a reflected wave changes depending on frequency in a frequency band of the transmission chirp.

<6>

The radar apparatus described in <1>, further including: an antenna substrate equipped with the transmission antenna and the reception antenna, and a reflective structures arranged on the antenna substrate so as to surround the transmission antenna and the reception antenna when the antenna substrate is viewed in a plan view, and the reflective structure has a characteristic that a direction of propagation of a reflected wave changes with frequency in a frequency band of the transmission chirp.

<7>

The radar apparatus described in any one of <1> to <6>, further including: an estimated multipath storage unit that stores position information regarding a peak that may occur in the frequency spectral waveforms due to a multipath effect, and in a case where the signal processing unit determines, based on the variations in peak position among the plurality of frequency spectral waveforms, whether or not the peak is due to a valid object, the signal processing unit changes, in a certain range based on the position information stored in the estimated multipath storage unit, a determination threshold for a degree of variation toward a direction in which it is easier to detect variations than in another range.

<8>

The radar apparatus described in any one of <1> to <7>, in which the transmission chirp includes at least two partial chirps for which frequency bands corresponding to at least two analysis periods among frequency bands corresponding to the plurality of analysis periods overlap.

<9>

The radar apparatus described in <8>, in which the transmission chirp includes two types of transmission chirp, which are a transmission chirp for multipath detection and a transmission chirp for target detection, the transmission chirp for multipath detection includes the at least two partial chirps, the transmission chirp for target detection has a wider frequency bandwidth than that of each of the partial chirps, and the signal processing unit obtains, in a case where the transmission chirp is the transmission chirp for multipath detection, a frequency spectral waveform of the intermediate frequency signal for each of the plurality of analysis periods, and obtains, in a case where the transmission chirp is the transmission chirp for target detection, one frequency spectral waveform of the intermediate frequency signal for the transmission chirp, and obtains, regarding a peak determined based on the plurality of frequency spectral waveforms to be a peak due to a valid object, a distance to the target, based on the frequency spectral waveform based on the transmission chirp for target detection and generated from the intermediate frequency signal.

<10>

A moving object including: a vehicle body, and a radar apparatus mounted on the vehicle body, and the radar apparatus includes a transmission signal generation unit that generates a transmission chirp, a transmission antenna that transmits the transmission chirp, a reception antenna that receives a reflected wave, from an object to be detected, of the transmission chirp transmitted from the transmission antenna, a mixer that mixes the transmission chirp and a reception chirp received by the reception antenna to generate an intermediate frequency signal, and a signal processing unit that performs processing on the intermediate frequency signal, and the signal processing unit obtains, for a plurality of respective analysis periods corresponding to different frequency bands of the transmission chirp, frequency spectral waveforms of the intermediate frequency signal, and determines, based on variations in peak position among the plurality of frequency spectral waveforms, whether or not a peak is due to a valid object.

<11>

The moving object described in <10>, in which the radar apparatus further includes a reflective structure attached to the vehicle body, and the reflective structure is attached to a position outside a field of view of the radar apparatus and on which a radio wave transmitted from the transmission antenna is incident, and the reflective structure has a characteristic that a direction of propagation of a reflected wave changes depending on frequency in a frequency band of the transmission chirp.

It goes without saying that each of the embodiments described above is an example and partial substitutions or combinations of the configurations illustrated in the different embodiments are possible. Similar effects of similar configurations in the plurality of embodiments will not be mentioned one by one sequentially for each embodiment. Furthermore, the present invention is not limited to the embodiments described above. For example, it should be obvious to those skilled in the art that various modifications, improvements, combinations, and so forth are possible.

REFERENCE SIGNS LIST

20 radar apparatus
21 transmission signal generation unit
22Tx transmission antenna
22Rx reception antenna
24 mixer
25 AD converter
26 signal processing unit
27 estimated multipath storage unit
31 antenna substrate
35, 35A, 35B, 35C, 35D, 35E reflective structure
40 field of view (FOV)
50 vehicle body
51 exterior of vehicle body
55 radome
60 metasurface
61 frequency selective surface
61A metal element
62 ground plate
63 dielectric layer
64 via
70 ground plate
71, 72, 73 dielectric layer
100 object to be detected
101 ground
105 moving object

The invention claimed is:

1. A radar apparatus comprising:

transmission signal generation circuitry that generates a transmission chirp;

a transmission antenna that transmits the transmission chirp;

a reception antenna that is configured to receive a reflected wave, from an object to be detected, of the transmission chirp transmitted from the transmission antenna;

a mixer that mixes the transmission chirp and a reception chirp received by the reception antenna to generate an intermediate frequency signal; and signal processing circuitry configured to perform processing on the intermediate frequency signal, wherein the signal processing circuitry is configured to obtain, for a plurality of respective analysis periods corresponding to different frequency bands of the transmission chirp, frequency spectral waveforms of the intermediate frequency signal, detect a peak appearing in the plurality of frequency spectral waveforms, and determine, based on variations in peak position among the plurality of frequency spectral waveforms, whether the peak is due to a target for detection that is present within a field of view.

2. The radar apparatus according to claim 1, further comprising:

a reflective structure arranged at a position outside a field of view of the radar apparatus and on which the transmission chirp transmitted from the transmission antenna is incident, wherein the reflective structure includes a metasurface that reflects the transmission chirp.

3. The radar apparatus according to claim 2, wherein the metasurface of the reflective structure faces in same direction as a direction of radiation of the transmission antenna, and the reflective structure exhibits a characteristic that a component of an incident wave parallel to the metasurface in a direction of propagation of the incident wave and a component of a reflected wave parallel to the metasurface in a direction of propagation of the reflected wave are in opposite directions in the frequency band of the transmission chirp, and the reflective structure further has a reflective surface in a region that is farther from the transmission antenna and the reception antenna than the metasurface of the reflective structure under a condition the metasurface of the reflective structure is viewed in a plan view, the reflective structure having a characteristic that a component of an incident wave parallel to the metasurface in a direction of propagation of the incident wave and a component of a reflected wave parallel to the metasurface in a direction of propagation of the reflected wave are in an identical direction for at least a portion the frequency band of the transmission chirp.

4. The radar apparatus according to claim 3, further comprising:

an estimated multipath storage memory device that stores position information regarding a peak that is determined to occur in the frequency spectral waveforms due to a multipath effect, wherein under a condition the signal processing circuitry determines, based on the variations in peak position among the plurality of frequency spectral waveforms, whether the peak is due to a target for detection that is present within a field of view, the signal processing circuitry changes, in a certain range based on the position information stored in the estimated multipath storage memory device, a determination threshold for a degree of variation toward a direction in which it is easier to detect variations than in another range.

5. The radar apparatus according to claim 3, wherein the transmission chirp includes at least two partial chirps for which frequency bands corresponding to at least two analysis periods among frequency bands corresponding to the plurality of analysis periods overlap.

6. The radar apparatus according to claim 2, further comprising:

an estimated multipath storage memory device that stores position information regarding a peak that is determined to occur in the frequency spectral waveforms due to a multipath effect, wherein under a condition the signal processing circuitry determines, based on the variations in peak position among the plurality of frequency spectral waveforms, whether the peak is due to a target for detection that is present within a field of view, the signal processing circuitry changes, in a certain range based on the position information stored in the estimated multipath storage memory device, a determination threshold for a degree of variation toward a direction in which it is easier to detect variations than in another range.

7. The radar apparatus according to claim 2, wherein the transmission chirp includes at least two partial chirps for which frequency bands corresponding to at least two analysis periods among frequency bands corresponding to the plurality of analysis periods overlap.

8. The radar apparatus according to claim 1, further comprising:

a reflective structure arranged at a position outside a field of view of the radar apparatus and on which the transmission chirp transmitted from the transmission antenna is incident, wherein the reflective structure includes a dielectric multilayer structure that reflects the transmission chirp.

9. The radar apparatus according to claim 8, further comprising:

an estimated multipath storage memory device that stores position information regarding a peak that is determined to occur in the frequency spectral waveforms due to a multipath effect, wherein under a condition the signal processing circuitry determines, based on the variations in peak position among the plurality of frequency spectral waveforms, whether the peak is due to a target for detection that is present within a field of view, the signal processing circuitry changes, in a certain range based on the position information stored in the estimated multipath storage memory device, a determination threshold for a degree of variation toward a direction in which it is easier to detect variations than in another range.

10. The radar apparatus according to claim 8, wherein the transmission chirp includes at least two partial chirps for which frequency bands corresponding to at least two analysis periods among frequency bands corresponding to the plurality of analysis periods overlap.

11. The radar apparatus according to claim 1, further comprising:

a reflective structure arranged at a position outside a field of view of the radar apparatus and on which the transmission chirp transmitted from the transmission antenna is incident, wherein the reflective structure has a characteristic that a direction of propagation of a reflected wave changes depending on frequency in a frequency band of the transmission chirp.

12. The radar apparatus according to claim 11, further comprising:

an estimated multipath storage memory device that stores position information regarding a peak that is determined to occur in the frequency spectral waveforms due to a multipath effect, wherein under a condition the signal processing circuitry determines, based on the variations in peak position among the plurality of frequency spectral waveforms, whether the peak is due to a target for detection that is present within a field of view, the signal processing circuitry changes, in a certain range based on the position information stored in the estimated multipath storage memory device, a determination threshold for a degree of variation toward a direction in which it is easier to detect variations than in another range.

13. The radar apparatus according to claim 1, further comprising:

an antenna substrate equipped with the transmission antenna and the reception antenna; and a reflective structure arranged on the antenna substrate so as to surround the transmission antenna and the reception antenna under a condition the antenna substrate is viewed in a plan view, wherein the reflective structure exhibits a characteristic that a direction of propagation of a reflected wave changes with frequency in a frequency band of the transmission chirp.

14. The radar apparatus according to claim 1, further comprising:

an estimated multipath storage memory device that stores position information regarding a peak that is determined to occur in the frequency spectral waveforms due to a multipath effect, wherein under a condition the signal processing circuitry determines, based on the variations in peak position among the plurality of frequency spectral waveforms, whether the peak is due to a target for detection that is present within a field of view, the signal processing circuitry changes, in a certain range based on the position information stored in the estimated multipath storage memory device, a determination threshold for a degree of variation toward a direction in which it is easier to detect variations than in another range.

15. The radar apparatus according to claim 1, wherein the transmission chirp includes at least two partial chirps for which frequency bands corresponding to at least two analysis periods among frequency bands corresponding to the plurality of analysis periods overlap.

16. The radar apparatus according to claim 15, wherein the transmission chirp includes a first type of transmission chirp for multipath detection and a second type of transmission chirp for target detection, the first type of transmission chirp for multipath detection includes the at least two partial chirps, the second type of transmission chirp for target detection has a wider frequency bandwidth than that of each of the partial chirps, and the signal processing circuitry is configured to obtain, under a condition the transmission chirp is the first type of transmission chirp for multipath detection, a frequency spectral waveform of the intermediate frequency signal for each of the plurality of analysis periods, and obtain, under a condition the transmission chirp is the second type of transmission chirp for target detection, one frequency spectral waveform of the intermediate frequency signal for the transmission chirp, and obtain, regarding a peak determined based on the plurality of frequency spectral waveforms to be a peak due to a target for detection that is present within a field of view, a distance to the target, based on the frequency spectral waveform based on the second type of transmission chirp for target detection and generated from the intermediate frequency signal.

17. A moving object comprising:

a vehicle body; and a radar apparatus mounted on the vehicle body, wherein the radar apparatus includes transmission signal generation circuitry that generates a transmission chirp, a transmission antenna that transmits the transmission chirp, a reception antenna that is configured to receive a reflected wave, from an object to be detected, of the transmission chirp transmitted from the transmission antenna, a mixer that mixes the transmission chirp and a reception chirp received by the reception antenna to generate an intermediate frequency signal, and signal processing circuitry configured to perform processing on the intermediate frequency signal, wherein the signal processing circuitry is configured to obtain, for a plurality of respective analysis periods corresponding to different frequency bands of the transmission chirp, frequency spectral waveforms of the intermediate frequency signal, and determine, based on variations in peak position among the plurality of frequency spectral waveforms, whether a peak is due to a target for detection that is present within a field of view.

18. The moving object according to claim 17, wherein the radar apparatus further includes a reflective structure attached to the vehicle body, wherein the reflective structure is attached to a position outside a field of view of the radar apparatus and on which the transmission chirp transmitted from the transmission antenna is incident, and the reflective structure exhibits a characteristic that a direction of propagation of a reflected wave changes depending on frequency in a frequency band of the transmission chirp.

19. The moving object according to claim 18, wherein the reflective structure comprises a metasurface that has a frequency dependent reflection angle characteristic.

20. The moving object according to claim 18, wherein the transmission chirp includes at least two partial chirps for which frequency bands corresponding to at least two analysis periods among frequency bands corresponding to the plurality of analysis periods overlap.

* * * * *